(12) United States Patent
Yamagami et al.

(10) Patent No.: US 8,529,348 B2
(45) Date of Patent: Sep. 10, 2013

(54) GAME APPARATUS AND STORAGE MEDIUM STORING GAME PROGRAM

(75) Inventors: Hitoshi Yamagami, Kyoto (JP); Kazuki Yoshihara, Kyoto (JP); Makoto Yoshida, Meguro-ku (JP)

(73) Assignee: Nintendo Co., Ltd., Kyoto (JP)

( * ) Notice: Subject to any disclaimer, the term of this patent is extended or adjusted under 35 U.S.C. 154(b) by 1462 days.

(21) Appl. No.: 12/216,662

(22) Filed: Jul. 9, 2008

(65) Prior Publication Data

US 2009/0258709 A1    Oct. 15, 2009

(30) Foreign Application Priority Data

Apr. 11, 2008   (JP) .................................. 2008-103824

(51) Int. Cl.
*G06F 17/00*    (2006.01)

(52) U.S. Cl.
USPC ...................... 463/42; 463/43; 463/40; 463/4

(58) Field of Classification Search
None
See application file for complete search history.

(56) References Cited

U.S. PATENT DOCUMENTS

| 7,731,589 | B2 * | 6/2010 | Kataoka et al. | 463/42 |
|---|---|---|---|---|
| 2003/0013529 | A1 * | 1/2003 | Miura et al. | 463/42 |
| 2004/0157654 | A1 * | 8/2004 | Kataoka et al. | 463/4 |
| 2004/0266535 | A1 * | 12/2004 | Reeves | 463/42 |
| 2007/0087827 | A1 * | 4/2007 | Hirota | 463/40 |
| 2009/0275371 | A1 * | 11/2009 | Takahashi et al. | 463/3 |
| 2010/0137045 | A2 * | 6/2010 | Angelopoulos | 463/1 |

FOREIGN PATENT DOCUMENTS

| JP | 10-201956 A | 8/1998 |
|---|---|---|
| JP | 11-76608 A | 3/1999 |
| JP | 2003-38858 A | 2/2003 |
| JP | 2005-319134 | 11/2005 |
| JP | 2006-280453 | 10/2006 |

* cited by examiner

*Primary Examiner* — Paul A D'Agostino
(74) *Attorney, Agent, or Firm* — Nixon & Vanderhye P.C.

(57) ABSTRACT

A player character appearing in a virtual game world is caused to perform actions in accordance with operation data. Based on the actions performed by the player character, operation tendency data, which indicates a tendency in operations performed by a player operating the player character, is generated, and a group of image data and the operation tendency data of the player character is stored. Then, an image of a non-player character indicated by the stored image data is displayed on a display device in accordance with the image data. An action of the non-player character in a virtual game world is controlled in accordance with the stored operation tendency data.

16 Claims, 17 Drawing Sheets

F I G. 1
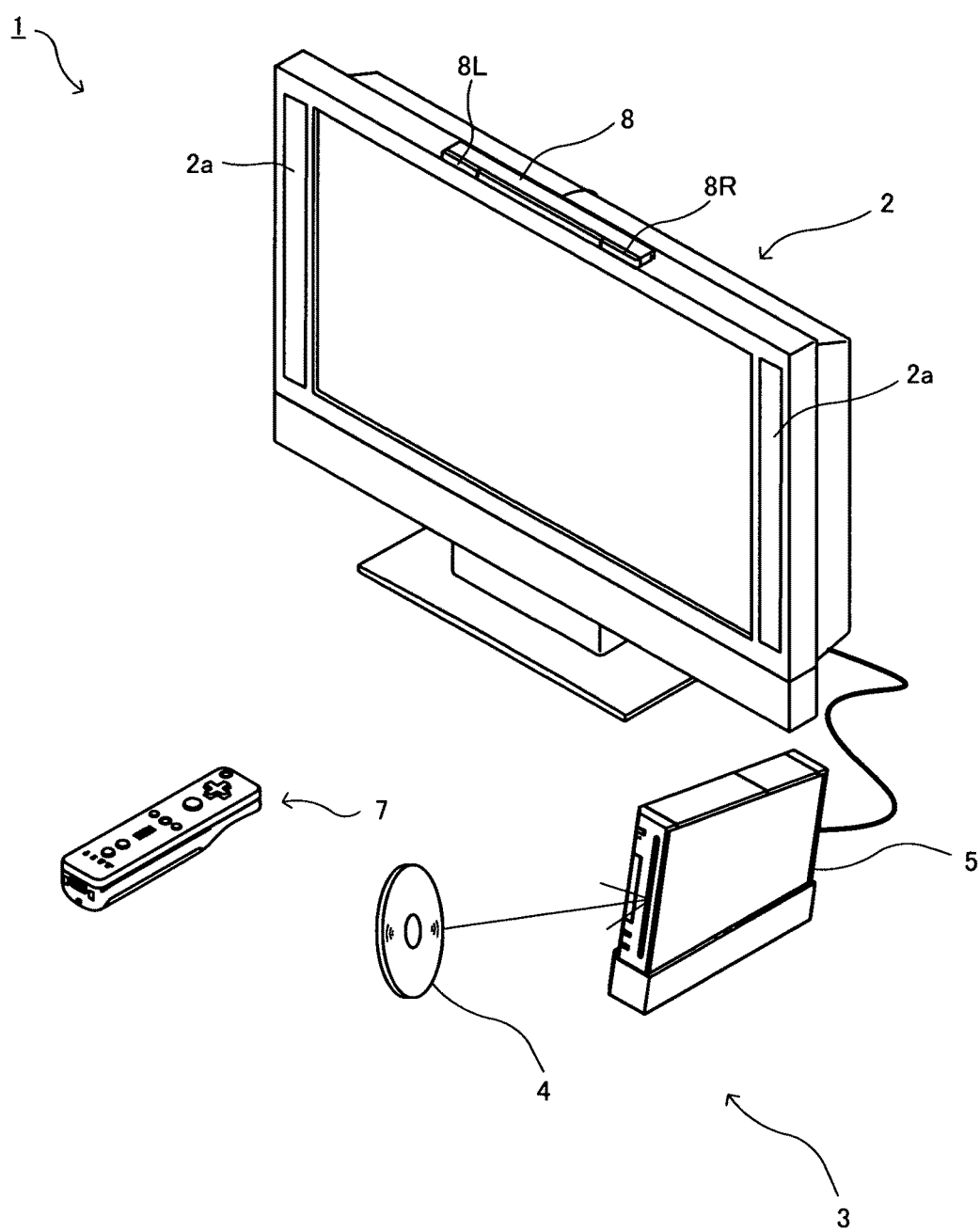

F I G. 3
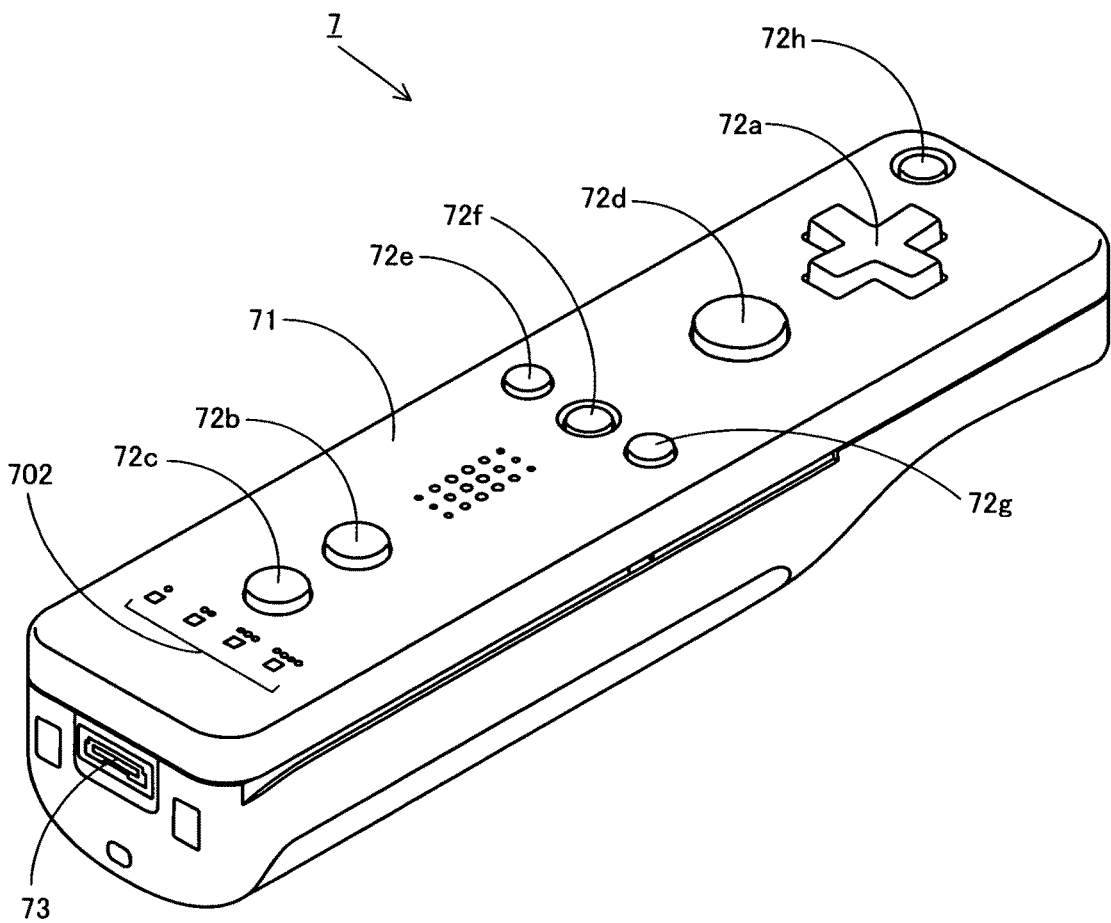

F I G. 5
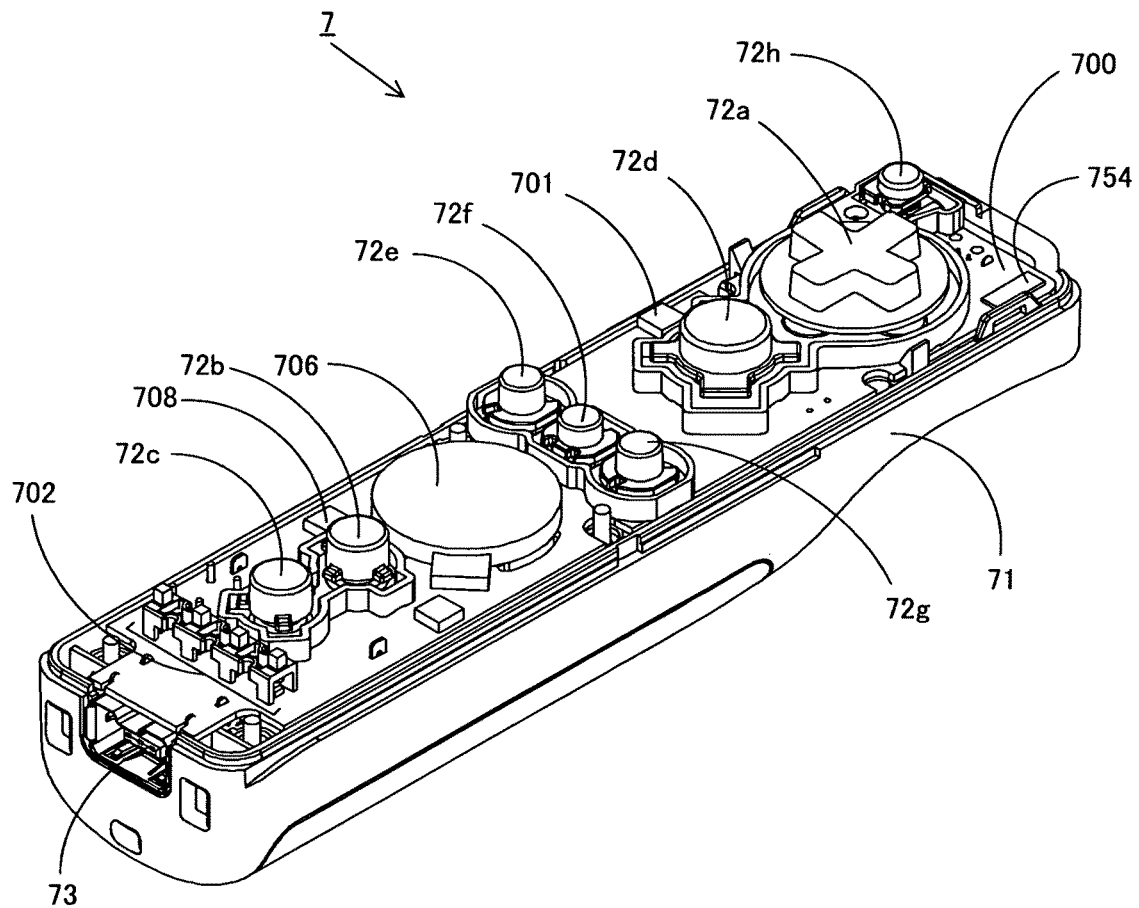

FIG. 12

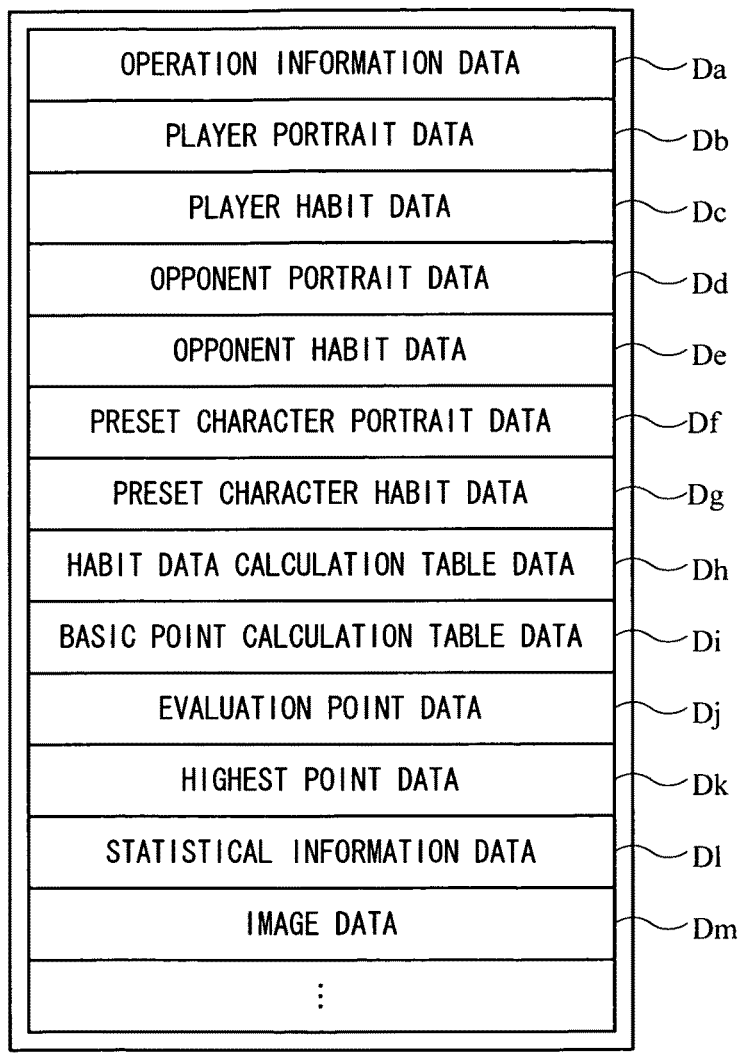

12,17,35

| OPERATION INFORMATION DATA | — Da |
| PLAYER PORTRAIT DATA | — Db |
| PLAYER HABIT DATA | — Dc |
| OPPONENT PORTRAIT DATA | — Dd |
| OPPONENT HABIT DATA | — De |
| PRESET CHARACTER PORTRAIT DATA | — Df |
| PRESET CHARACTER HABIT DATA | — Dg |
| HABIT DATA CALCULATION TABLE DATA | — Dh |
| BASIC POINT CALCULATION TABLE DATA | — Di |
| EVALUATION POINT DATA | — Dj |
| HIGHEST POINT DATA | — Dk |
| STATISTICAL INFORMATION DATA | — Dl |
| IMAGE DATA | — Dm |

| FURIKOMI RATE | ~11% | 11~13% | 13~15% | 15~18% | 18~21% | 21%~ |
|---|---|---|---|---|---|---|
| COEFFICIENT A | 2.0 | 1.5 | 1.0 | 0.8 | 0.5 | 0.0 |

FIG. 14

| WINNING RATE | ~18% | 18~20% | 20~22% | 22~24% | 24~26% | 26~28% | 28%~ |
|---|---|---|---|---|---|---|---|
| COEFFICIENT B | 0.4 | 0.6 | 0.8 | 1.0 | 1.2 | 1.4 | 1.6 |

| | | STATE OF OPPONENT | | |
|---|---|---|---|---|
| | | REACH | CALLING | OTHERS |
| DISCARDED TILE | GENBUTU | 0 | 0 | 0 |
| | SUJI· KABE | -20 | -4 | 0 |
| | OTHERS | -60 | -10 | -2 |

| NUMBER OF NECESSARY TILES TO BECOME TENPAI | BASIC POINTS |
|---|---|
| TENPAI | 250 |
| 1 | 150 |
| 2 | 80 |
| 3 | 30 |
| 4 | 4 |
| 5 | 2 |
| 6 OR GREATER | 0 |

GAME APPARATUS AND STORAGE MEDIUM STORING GAME PROGRAM

CROSS REFERENCE TO RELATED APPLICATION

The disclosure of Japanese Patent Application No. 2008-103824, filed Apr. 11, 2008, is incorporated herein by reference.

BACKGROUND AND SUMMARY

1. Technical Field

The technology presented herein relates to a game apparatus and a storage medium storing a game program. The present technology particularly relates to a game apparatus and a game program for simulating a versus game against another player, and to a storage medium storing the game program.

2. Description of the Background Art

Conventionally, there are known game systems for simulating a versus game against another player, as disclosed in, e.g., Japanese Laid-Open Patent Publication No. 2005-319134 (herein after, referred to as Patent Document 1) and Japanese Laid-Open Patent Publication No. 2006-280453 (herein after, referred to as Patent Document 2). A game apparatus disclosed in Patent Document 1 generates, based on a play history of a player, a tendency parameter indicative of a tendency in a game play of the player (i.e., the player's habit), and transmits the tendency parameter to another game apparatus. When the game apparatus receives such a tendency parameter from another game apparatus, an application processing section of the game apparatus causes a character to act based on the tendency parameter. This allows the player of the game apparatus to perform a simulated versus play against another player.

Patent Document 2 discloses a server system for reproducing a tendency in operation inputs, performed by a player using a game apparatus capable of communicating with a server, in another game apparatus, thereby realizing, in said another game apparatus, a versus play against a character simulating the player. In the server system disclosed in Patent Document 2, the server generates a reproduction code based on play tendency data uploaded by a game apparatus, and transmits the generated reproduction code to a player terminal. Accordingly, a player of the player terminal can use the obtained reproduction code to perform a simulated versus play against another player.

However, the game apparatus disclosed in Patent Document 1 and the server system disclosed in Patent Document 2 are each for enabling a simulated versus play against another player, by only transmitting/receiving the play tendency data (player's habit). Here, when the play tendency data of a player is transmitted/received, the play tendency data is not associated with character data representing the player. For example, a character to be controlled using the received play tendency data is selected from among a plurality of types of characters which are stored in advance in the game apparatus, and therefore, there is a case where a feature of the player, based on which the play tendency data is generated, does not match a feature of the selected character. Thus, there is a problem that the simulated versus game lacks reality.

SUMMARY

Therefore, a main feature of the example embodiments presented herein is to provide a game apparatus and a game program which are capable of improving reality of a simulated versus game against another player, and to provide a storage medium storing the game program.

The present embodiments have the following features to achieve the above. Note that reference numerals, step numbers and the like indicated between parentheses are merely provided to facilitate the understanding of the present embodiment in relation to the later-described embodiment, rather than limiting the scope of the present embodiment in any way.

A first aspect of the present embodiment is a game apparatus (3) capable of executing a predetermined game in accordance with operation inputs performed by a player, and communicating with another game apparatus. The game apparatus comprises operation data obtaining means (a CPU 10 performing step S103; hereinafter, only step numbers are indicated), player character control means (S103), operation tendency data generation means (S105, S122), player data storage means (S52 to S54, S105, S122, Db, Dc), transmission means (S86, S124), reception means (S87, S125), non-player data storage means (S88, S126, Dd, De), display control means (S114, FIGS. 9 to 11) and non-player character control means (S108 to S114). The operation data obtaining means obtains operation data (Da) outputted from an input device. The player character control means causes a player character appearing in a virtual game world to perform an action in accordance with the operation data. The operation tendency data generation means generates, based on actions performed by the player character controlled by the player character control means, operation tendency data (habit data) which indicates a tendency in operations performed by the player operating the player character. The player data storage means stores image data of the player character controlled by the player character control means and the operation tendency data generated by the operation tendency data generation means. The transmission means transmits, to said another game apparatus, a group of the image data and the operation tendency data stored in the player data storage means. The reception means receives a group of the image data and the operation tendency data transmitted from said another game apparatus. The non-player data storage means stores the group of the image data and the operation tendency data of said another game apparatus which the reception means has received. Based on the image data of said another game apparatus stored in the non-player data storage means, the display control means displays on a display device (2) an image of a non-player character indicated by the image data. The non-player character control means controls, based on the operation tendency data of said another game apparatus stored in the non-player data storage means, an action performed by the non-player character in the virtual game world.

In a second aspect of the present embodiment, the game apparatus further comprises image data generation means for generating, as the image data, data indicating a portrait (portrait data) which is created by selecting, in accordance with the operation data, a part object for each part of the portrait from among a plurality of types of part objects prepared in advance for each part of the portrait, and by compositing selected part objects.

In a third aspect of the present embodiment, the non-player character control means determines an action of the non-player character by weighting, using numerical values (coefficient A and coefficient B) indicated by the operation tendency data, respective points of items set for a game situation (safety basic points, winning probability basic points, and specific situation additional points).

In a fourth aspect of the present embodiment, the non-player character control means: weights, using the numerical values indicated by the operation tendency data, the respective points of the items which are set for each action option (possible move) for the game situation; calculates total points (E) for each action option; and determines an action option of highest total points as an action to be performed by the non-player character.

In a fifth aspect of the present embodiment, the operation tendency data generation means generates the operation tendency data by estimating, based on a rate of selecting an action of the player character in a game situation (specific situation), a tendency in operations performed by the player (FIG. 15).

In a sixth aspect of the present embodiment, each time a similar situation to the game situation appears, the operation tendency data generation means updates the rate of selecting the action, thereby updating the operation tendency data.

In a seventh aspect of the present embodiment, the operation tendency data generation means includes statistical information generation means (S121) for generating and storing statistical information about a result of the game in which the player character has performed actions (Dl). The operation tendency data generation means estimates, based on the statistical information about the player character, a tendency in operations performed by the player, thereby generating the operation tendency data.

In an eighth aspect of the present embodiment, the game apparatus further comprises: question providing means and operation tendency data correction means. The question providing means provides a question in relation to a player of said another game apparatus. The operation tendency data correction means corrects, in accordance with the operation data which is obtained as an answer to the question from the question providing means, the operation tendency data indicating a tendency in operations performed by the player of said another game apparatus, which operation tendency data is stored in the non-player data storage means.

In a ninth aspect of the present embodiment, the operation tendency data generation means sets an initial value indicated by the operation tendency data, in accordance with the part object selected by the image data generating means.

A tenth aspect of the present embodiment is a game apparatus capable of executing a predetermined game in accordance with operation inputs performed by a player. The game apparatus comprises operation data obtaining means, player character control means, operation tendency data generation means, player data storage means, non-player data storage means, display control means and non-player character control means. The operation data obtaining means obtains operation data outputted from an input device. The player character control means causes a player character appearing in a virtual game world to perform an action in accordance with the operation data. The operation tendency data generation means generates, based on actions performed by the player character controlled by the player character control means, operation tendency data which indicates a tendency in operations performed by the player operating the player character. The player data storage means stores image data of the player character controlled by the player character control means and the operation tendency data generated by the operation tendency data generation means. Then on-player data storage means selects, from among groups of the image data and the operation tendency data stored in the player data storage means, a group of the image data and the operation tendency data to be used to display a non-player character and cause the non-player character to perform an action, and stores the selected group of the image data and the operation tendency data. Based on the image data stored in the non-player data storage means, the display control means displays on a display device an image of the non-player character indicated by the image data. The non-player character control means controls, based on the operation tendency data stored in the non-player data storage means, the action of the non-player character in the virtual game world.

An eleventh aspect of the present embodiment is a computer-readable storage medium for storing a game program to be executed by a computer (10) of a game apparatus which is capable of executing a predetermined game in accordance with operation inputs performed by a player and which is capable of communicating with another game apparatus. The game program causes the computer to act as operation data obtaining means, player character control means, operation tendency data generation means, player data storage control means, transmission means, reception means, non-player data storage control means, display control means, and non-player character control means. The operation data obtaining means obtains operation data outputted from an input device. The player character control means causes a player character appearing in a virtual game world to perform an action in accordance with the operation data. The operation tendency data generation means generates, based on actions of the player character controlled by the player character control means, operation tendency data which indicates a tendency in operations performed by the player operating the player character. The player data storage control means stores, in a memory (12, 17, 35), image data of the player character controlled by the player character control means and the operation tendency data generated by the operation tendency data generation means. The transmission means transmits, to said another game apparatus, a group of the image data and the operation tendency data stored in the memory. The reception means receives a group of the image data and the operation tendency data transmitted from said another game apparatus. The non-player data storage control means stores, in the memory, the group of the image data and the operation tendency data of said another game apparatus which the reception means has received. Based on the image data of said another game apparatus which the non-player data storage control means has stored in the memory, the display control means displays on a display device an image of a non-player character indicated by the image data. The non-player character control means controls, based on the operation tendency data of said another game apparatus which the non-player data storage control means has stored in the memory, an action performed by the non-player character in the virtual game world.

A twelfth aspect of the present embodiment is a computer-readable storage medium for storing a game program to be executed by a computer of a game apparatus which is capable of executing a predetermined game in accordance with operation inputs performed by a player. The game program causes the computer to act as operation data obtaining means, player character control means, operation tendency data generation means, player data storage control means, non-player data storage control means, display control means and non-player character control means. The operation data obtaining means obtains operation data outputted from an input device. The player character control means causes a player character appearing in a virtual game world to perform an action in accordance with the operation data. The operation tendency data generation means generates, based on actions of the player character controlled by the player character control means, operation tendency data which indicates a tendency in operations performed by the player operating the player character. The player data storage control means stores, in a memory, image data of the player character controlled by the player character control means and the operation tendency data generated by the operation tendency data generation means. The non-player data storage control means selects, from among groups of the image data and the operation tendency data stored by the player data storage control means, a group of the image data and the operation tendency data to be used to display a non-player character and cause the non-player character to perform an action, and stores, in the memory, the selected group of the image data and the operation tendency data. Based on the image data which the non-player data storage control means has stored in the memory, the display control means displays on a display device an image of the non-player character indicated by the image data. Then on-player character control means controls, based on the operation tendency data which the non-player data storage control means has stored in the memory, the action of the non-player character in the virtual game world.

According to the above first aspect, the operation tendency data of players and the image data of player characters operated by the players are transmitted/received between the game apparatus and another game apparatus. Then, even after the game apparatus has ended a communication with said another game apparatus, the game apparatus can use, as a non-player character, the character previously used by said another game apparatus. In this case, the character is displayed on a screen based on the image data which has already been received, and actions of the character are controlled based on the operation tendency data which has already been received. This allows the player of the game apparatus to feel as if to be really playing the game against the player character operated by the player of said another game apparatus. Thus, reality of the simulated play is improved.

According to the above second aspect, a portrait which represents a player operating another game apparatus is transmitted and received together with an operation tendency of the player. This further improves the reality of the simulated play.

According to the above third aspect, an action of the non-player character to be performed in a specific situation or the like which appears during the game, is determined by weighting in accordance with an operation tendency of another player. Therefore, the non-player character can perform an action which reflects the operation tendency of said another player in the specific situation.

According to the above fourth aspect, when there are a plurality of action options in the specific situation or the like which appears during the game, an action to be selected by the non-player character is determined by weighting in accordance with the operation tendency of said another player. Therefore, the non-player character can perform an action which is selected so as to reflect the operation tendency of said another player in the specific situation.

According to the above fifth aspect, the operation tendency data, which reflects the operation tendency of said another player in the specific situation or the like appearing during the game, can be generated.

According to the above sixth aspect, the operation tendency data is updated each time the specific situation or the like appears during the game. Therefore, then on-player character can perform an action which reflects a most recent operation tendency.

According to the above seventh aspect, an action of the non-player character is determined by weighting in accordance with the operation tendency of said another player, which operation tendency is based on statistical information about a game result. Therefore, the non-player character can perform an action which reflects said another player's tendency to advance through the game.

According to the above eighth aspect, the operation tendency data is corrected in accordance with an answer to the question in relation to said another player. This allows the operation tendency data, which reflects personalities or the like of said another player observed from an objective point of view, to be generated.

According to the above ninth aspect, the operation tendency data is generated based on a portrait created by the player.

According to the above tenth aspect, the operation tendency data of a player who has played using the game apparatus, and the image data of a player character operated by the player are stored. This allows a character previously used by the game apparatus to be used as a non-player character. In this case, the character is displayed on a screen based on the image data previously used in a game play, and actions of the character are controlled based on the operation tendency data. This allows a player to feel as if to be really playing the game against a player character operated by another player who played in the past using the game apparatus. Thus, reality of the simulated play is improved. For example, in the case of such a game as a mah-jong game, card game or the like where opponents' tiles or cards are hidden during the game, it is difficult for a plurality of players to operate the same game apparatus at the same time to play the game. However, using the image data and the operation tendency data obtained in advance realizes a realistic game in which the player feels as if the game was played by a plurality of players performing operations at the same time.

According to the storage medium storing the game program of the present embodiment, the same effect as that of the above-described game apparatus can be obtained.

These and other features, aspects and advantages of the present embodiment will become more apparent from the following detailed description of the present embodiment when taken in conjunction with the accompanying drawings.

BRIEF DESCRIPTION OF THE DRAWINGS

FIG. 1 is an external view illustrating a game system 1 according to an embodiment;

FIG. 3 is an isometric view of the controller 7 of FIG. 1, seen from a top rear side thereof;

FIG. 5 is an isometric view illustrating a state where an upper casing of the controller 7 of FIG. 3 is removed;

FIG. 12 shows an example of main data to be stored in a main memory and/or a flash memory 17 of the game apparatus body 5;

FIG. 13 shows exemplary data showing a coefficient A calculation table, which is contained in habit data calculation table data Dh of FIG. 12;

FIG. 14 shows exemplary data showing a coefficient B calculation table, which is contained in the habit data calculation table data Dh of FIG. 12;

FIG. 16 shows exemplary data showing a safety basic point calculation table, which is contained in basic point calculation table data Di of FIG. 12;

FIG. 17 shows exemplary data showing an winning probability basic point calculation table, which is contained in the basic point calculation table data Di of FIG. 12;

DESCRIPTION OF THE PREFERRED EMBODIMENTS

Figure 2:
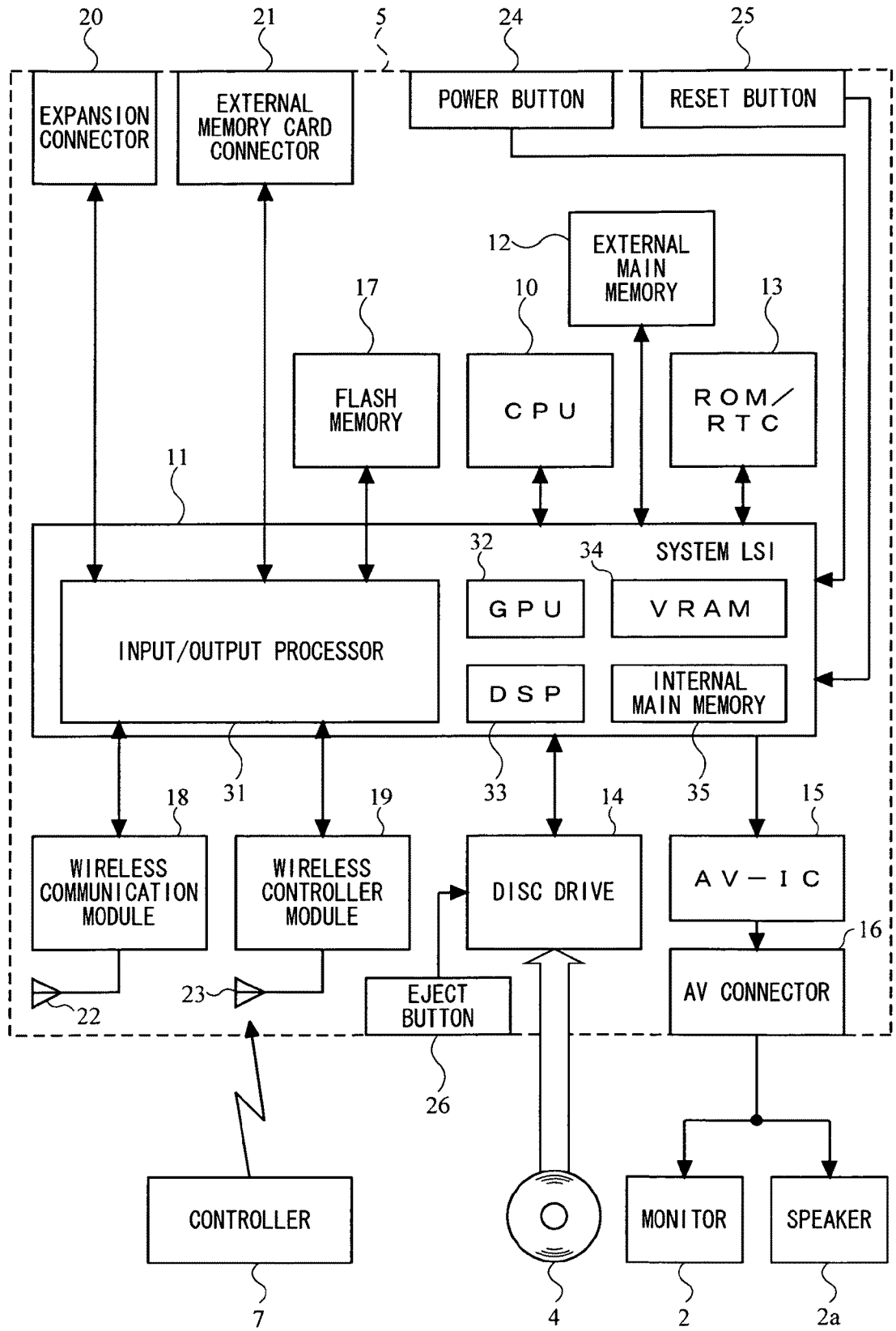
FIG. 2 is a functional block diagram of a game apparatus body 5 of FIG. 1.

With reference to FIG. 1, an apparatus for executing an image processing program according to an embodiment will be described. Hereinafter, in order to give a specific description, a game system including a stationary game apparatus body 5 which is an example of the above apparatus will be described. FIG. 1 is an external view illustrating a game system 1 including a stationary game apparatus 3. FIG. 2 is a block diagram of the game apparatus body 5. The game system 1 will be described below.

As shown in FIG. 1, the game system 1 comprises: a home-use TV receiver 2 (herein after, referred to as a monitor 2) which is an example of display means; and the stationary game apparatus 3 connected to the monitor 2 via a connection cord. The monitor 2 has speakers 2a for outputting, in the form of sound, an audio signal outputted from the game apparatus body 5. The game apparatus 3 includes: an optical disc 4 in which a game program, which is an exemplary game program of the present invention, is stored; the game apparatus body 5 having a computer for executing the game program of the optical disc 4, thereby causing the monitor 2 to output a game display; and a controller 7 for providing the game apparatus body 5 with necessary operation information for a game in which a character or the like displayed in the game display is controlled.

The game apparatus body 5 has a wireless controller module 19 therein (see FIG. 2). The wireless controller module 19 receives data wirelessly transmitted from the controller 7, and transmits data from the game apparatus body 5 to the controller 7. In this manner, the controller 7 and game apparatus body 5 are connected by radio communication. Further, the optical disc 4 as an example of an exchangeable information storage medium is detachably mounted on the game apparatus body 5.

On the game apparatus body 5, a flash memory 17 (see FIG. 2) is mounted, the flash memory 17 functioning as a backup memory for fixedly storing, e.g., later-described various data and saved data for game software processing. The game apparatus body 5 executes the game program or the like stored on the optical disc 4, and displays a result thereof as a game image on the monitor 2. The game program or the like to be executed may be stored not only on the optical disc 4, but also prestored in the flash memory 17. The game apparatus body 5 can reproduce a state of the game played in the past, by using the saved data stored in the flash memory 17, and display a game image of the reproduced state on the monitor 2. A player playing with the game apparatus body 5 can enjoy the game by operating the controller 7 while watching the game image displayed on the monitor 2.

By using the technology of, for example, Bluetooth (registered trademark), the controller 7 wirelessly transmits transmission data such as operation information to the game apparatus body 5 having the wireless controller module 19 therein. The controller 7 is operation means for mainly controlling an object or the like displayed on a display screen of the monitor 2. The controller 7 has a housing, which is small enough to be held by one hand, and a plurality of operation buttons (including a cross key, a stick or the like) exposed at a surface of the housing. As described later in detail, the controller 7 includes an imaging information calculation section 74 for taking an image of a view seen from the controller 7. As exemplary imaging targets of the imaging information calculation section 74, two LED modules 8L and 8R (herein after, referred to as "markers 8L and 8R") are provided in the vicinity of the display screen of the monitor 2. The markers 8L and 8R each output, e.g., an infrared light forward from the monitor 2. The controller 7 is capable of receiving, at a communication section 75, transmission data wirelessly transmitted from the wireless controller module 19 of the game apparatus body 5, and generating a sound or vibration based on the transmission data.

Next, an internal configuration of the game apparatus body 5 will be described with reference to FIG. 2. FIG. 2 is a block diagram showing the configuration of the game apparatus body 5. The game apparatus body 5 has a CPU (Central Processing Unit) 10, system LSI (Large Scale Integration) 11, external main memory 12, ROM/RTC (Read Only Memory/Real Time Clock) 13, disc drive 14, AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, ROM/RTC 13, disc drive 14 and the AV-IC 15 are connected to the system LSI 11. The system LSI 11 performs processing such as: controlling data transfer among components connected to the system LSI 11; generating an image to be displayed; and obtaining data from external devices. An internal configuration of the system LSI 11 will be described later. The external main memory 12, which is a volatile memory, stores such a program as the game program loaded from the optical disc 4, or the game program loaded from the flash memory 17, and various data. The external main memory 12 is used as a work region or buffer region of the CPU 10. The ROM/RTC 13 has a ROM, in which a boot program for the game apparatus body 5 is incorporated (so-called boot ROM), and a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34 and the internal main memory 35 are provided. Although not shown, these components 31 to 35 are connected to each other via an internal bus.

The GPU 32 partly forms rendering means, and generates an image in accordance with a graphics command from the CPU 10. The VRAM 34 stores necessary data for the GPU 32 to execute the graphics command (data such as polygon data and texture data). At the time of generating the image, the GPU 32 uses the data stored in the VRAM 34, thereby generating image data.

The DSP 33 acts as an audio processor, and generates audio data by using sound data and sound waveform (tone) data stored in the internal main memory 35 and external main memory 12. In order for the speakers 2a to output a sound, the DSP 33 reads the sound data, and causes the speakers 2a of the monitor 2 to output the sound data via the AV-IC 15 and an AV connector 16. In order for a speaker 706 (see FIG. 7) of the controller 7 to output a sound, the DSP 33 reads the sound data, and transmits the audio data to the controller 7 via the wireless controller module 19 and an antenna 23.

The image data and audio data generated in the above manner are read by the AV-IC 15. The AV-IC 15 outputs the read image data to the monitor 2 via the AV connector 16, and outputs the read audio data to the speakers 2a embedded in the monitor 2. As a result, the image is displayed on the monitor 2 and the sound is outputted from the speakers 2a.

The input/output processor (I/O Processor) 31 performs data transmission/reception with components connected thereto, and downloads data from external devices, for example. The input/output processor 31 is connected to the flash memory 17, a wireless communication module 18, the wireless controller module 19, an expansion connector 20 and an external memory card connector 21. An antenna 22 is connected to the wireless communication module 18, and the antenna 23 is connected to the wireless controller module 19.

The input/output processor 31 is connected to a network via the wireless communication module 18 and antenna 22, thereby communicating with other game apparatuses and various servers connected to the network. The input/output processor 31 regularly accesses the flash memory 17 to detect presence or absence of data which is required to be transmitted to the network. If such data is present, the data is transmitted to the network via the wireless communication module 18 and antenna 22. Also, the input/output processor 31 receives, via the network, antenna 22 and wireless communication module 18, data transmitted from other game apparatuses or data downloaded from a download server, and stores the received data in the flash memory 17. By executing the game program, the CPU 10 reads the data stored in the flash memory 17 to use the data for execution of the game program. In addition to the data transmitted and received between the game apparatus body 5 and other game apparatuses or various servers, the flash memory 17 may store, as described above, saved data of the game which is played using the game apparatus body 5 (such as result data or progress data of the game).

Further, the input/output processor 31 receives, via the antenna 23 and wireless controller module 19, operation data or the like transmitted from the controller 7, and stores (temporarily) the operation data or the like in a buffer region of the internal main memory 35 or external main memory 12. Note that, similarly to the external main memory 12, the internal main memory 35 may store such a program as the game program loaded from the optical disc 4, or the game program loaded from the flash memory 17, and various data. The internal main memory 35 may be used as a work region or buffer region of the CPU 10.

In addition, the expansion connector 20 and the external memory card connector 21 are connected to the input/output processor 31. The expansion connector 20 is a connector for such interface as USB or SCSI. The expansion connector 20, instead of the wireless communication module 18, is able to perform communications with a network by being connected to such a medium as external storage medium, a peripheral device, e.g., another controller, or a connector for wired communication. The external memory card connector 21 is a connector to be connected to an external storage medium such as a memory card. For example, the input/output processor 31 is able to access the external storage medium via the expansion connector 20 or external memory card connector 21 to store or read data from the external storage medium.

On the game apparatus body 5 (e.g., on a front main surface), a power button 24 of the game apparatus body 5, a reset button 25 for game processing, an insertion slot for mounting the optical disc 4 in a detachable manner, an eject button 26 for ejecting the optical disc 4 from the insertion slot of the game apparatus body 5, and the like are provided. The power button 24 and reset button 25 are connected to the system LSI 11. When the power button 24 is turned on, each component of the game apparatus body 5 is supplied with power via an AC adaptor which is not shown. If, when the power button 24 is already turned on, the power button 24 is pressed again, the game apparatus body 5 shifts to a power-saving stand-by mode in which the game apparatus body 5 operates with relatively low power. Since the power is supplied to the game apparatus body 5 even in the power-saving stand-by mode, the game apparatus body 5 can be always connected to a network, e.g. the Internet. Note that, if it is desired to turn off the game apparatus body 5 completely when the power button 24 is already turned on, the game apparatus body 5 can be turned off completely by pressing the power button 24 for a predetermined period of time or longer. When the reset button 25 is pressed, the system LSI 11 reexecutes the boot program of the game apparatus body 5. The eject button 26 is connected to the disc drive 14. When the eject button 26 is pressed, the optical disc 4 is ejected from the disc drive 14.

Described below are types of communications which the game apparatus body 5 performs with another apparatus (another game apparatus or a server). The communications to be performed here can be roughly categorized into two types. The first type is a communication using an always-connected network, which can be performed even in the aforementioned power-saving stand-by mode (herein after, referred to as an always-on connection communication), and the second type is a communication which depends on an application program, e.g., a program of an online player-versus-player game, and in which a communication control is performed such that a connection is established only when necessary (herein after, referred to as an on-demand connection communication). In the always-on connection communication, the input/output processor 31 independently transmits, as described above, transmission data written in the flash memory 17, regardless of processing based on various programs such as a game program and the like, and writes, into the flash memory 17, data received or downloaded via the antenna 22 and the wireless communication module 18. Accordingly, an application using the always-on connection communication (e.g., an email application) is only required to write into the flash memory 17 data to be transmitted, and to read from the flash memory 17 received data. By using the always-on connection communication, the communication can be regularly performed even in the power-saving stand-by mode, and further, even when a predetermined game program is being executed, the communication can be performed also for background processing thereof.

The game apparatus body 5 can be communicably connected, via a network or the like, to a server on the network. For example, the game apparatus body 5 uses the above-described on-demand connection communication to perform data transmission/reception to and from the server. Roughly speaking, in the server, a storage device, a memory, a CPU and a communication section are connected to each other via a bus. The CPU of the server is a computing device or a control device for executing various programs loaded from the storage device to the memory. Further, the communication section of the server communicates with the game apparatus body 5 or the like via the network.

For example, a main function of the server is to regularly receive terminal information from each game apparatus 3 and store the terminal information in the memory, and in response to a request from a game apparatus 3, return, based on the terminal information, an address information list to the game apparatus 3. The terminal information contains a terminal ID, an IP address, a host flag, a user ID and the like of each game apparatus 3, and is updated based on information transmitted from each game apparatus 3. The terminal ID is information for identifying a game apparatus 3. The IP address is address information for accessing the game apparatus 3 by means of TCP/IP protocol, and contains port number information. The host flag indicates whether or not the game apparatus 3 is currently operating as a host terminal. The user ID is information for identifying a user playing a game using the game apparatus 3. The game apparatuses 3 can use the received address information list to establish a peer-to-peer network so as to allow a plurality of players to play a game together, and in the established peer-to-peer network, the user terminals execute a video game such as a mah-jong game or the like by transmitting/receiving game data to and from each other.

As one example, when a game apparatus 3 requests the address information list, the server extracts at least one piece of terminal information in which the host flag is ON, and returns, to the game apparatus 3, a list of the extracted terminal information as the address information list. Next, the game apparatus 3 extracts, as a connection request destination, the at least one piece of terminal information from the address information list. Then, by using the IP address contained in the extracted terminal information, the game apparatus 3 starts communicating with another game apparatus 3 which is the connection request destination.

Figure 4:
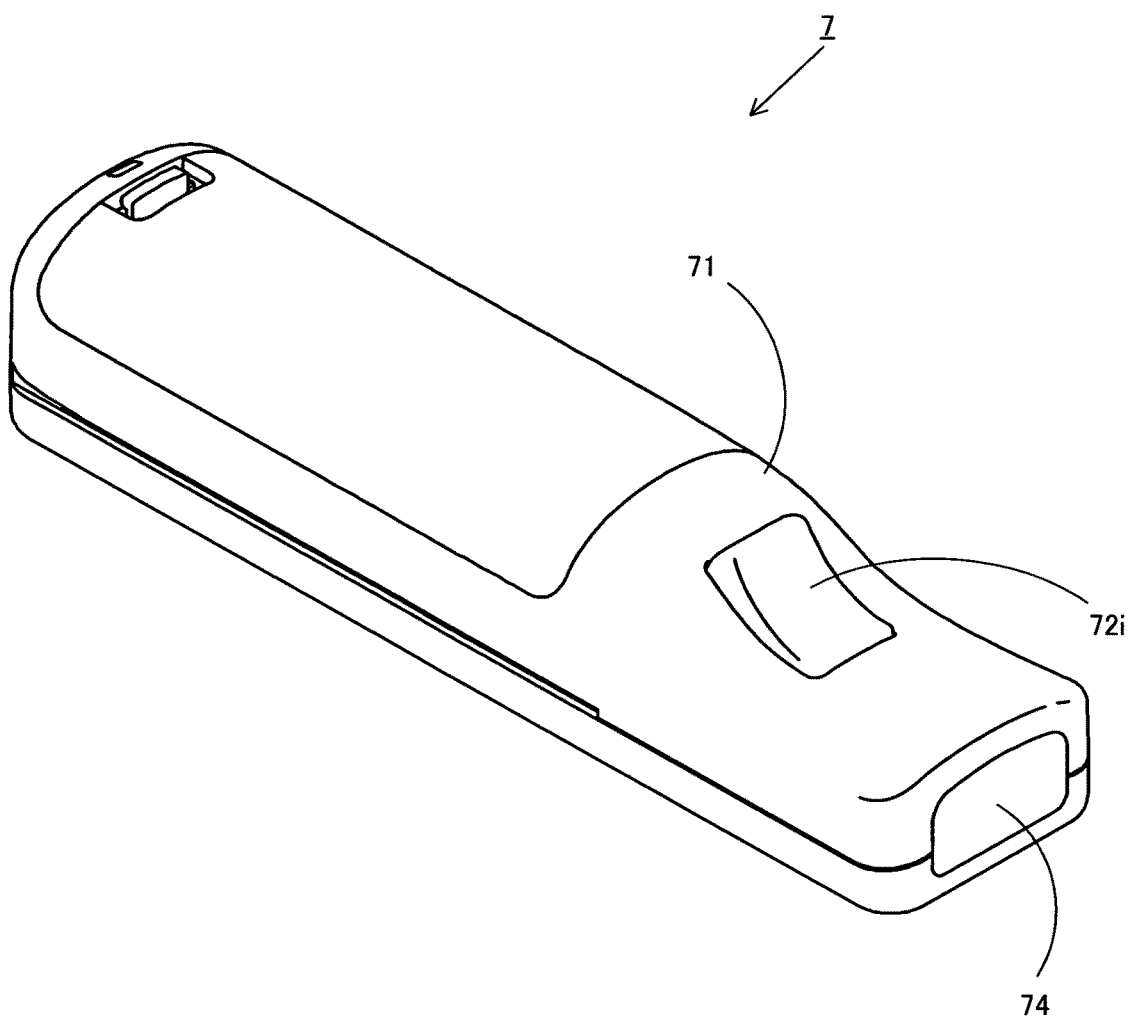
FIG. 4 is an isometric view of the controller 7 of FIG. 3, seen from a bottom front side thereof.

With reference to FIGS. 3 and 4, the controller 7 will be described. FIG. 3 is an isometric view of the controller 7 seen from a top rear side thereof. FIG. 4 is an isometric view of the controller 7 seen from a bottom front side thereof.

As shown in FIGS. 3 and 4, the controller 7 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or give an instruction to select one of a plurality of options.

The cross key 72a is an operation section for outputting an operation signal in accordance with the above-described direction input operation performed by the player. Such an operation section may be provided in another form. For example, an operation section, which has four push switches arranged in crisscross directions and which is capable of outputting an operation signal in accordance with a push switch pressed by the player, may be provided. Alternatively, an operation section, which has a composite switch having, in addition to the above four push switches, a center switch at an intersection point of the above crisscross directions, may be provided. Still alternatively, the cross key 72a may be replaced with an operation section which includes an inclinable stick (so-called joy stick) projecting from a top surface of the housing 71 and which outputs an operation signal in accordance with an inclining direction of the stick. Still alternatively, the cross key 72a may be replaced with an operation section which includes a horizontally-slidable disc-shaped member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, 2nd button and A button are assigned to the operation buttons 72b to 72d. Also, functions as a minus button, home button and plus button are assigned to the operation buttons 72e to 72g, for example. Various operation functions are assigned to the operation buttons 72a to 72g in accordance with the game program executed by the game apparatus body 5. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, e.g., informing the player of the controller type which is currently set for the controller 7. Specifically, a signal is transmitted from the wireless controller module 19 to the controller 7 such that one of the plurality of LEDs 702, which corresponds to the controller type of the controller 7, is lit up.

On the top surface of the housing 71, sound holes for outputting sounds from a later-described speaker (speaker 706 shown in FIG. 5) to the external space are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller 7 so as to point a front surface thereof to the markers 8L and 8R. On a slope surface of the recessed portion, an operation button 72i is provided. The operation button 72i is an operation section acting as, for example, a B button.

On a front surface of the housing 71, an image pickup element 743 forming a part of the imaging information calculation section 74 is provided. The imaging information calculation section 74 is a system for: analyzing image data of an image taken by the controller 7; identifying an area having a high brightness in the image; and detecting a position of a center of gravity, a size and the like of the area. The imaging information calculation section 74 has, for example, a maximum sampling period of approximately 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

Figure 6:
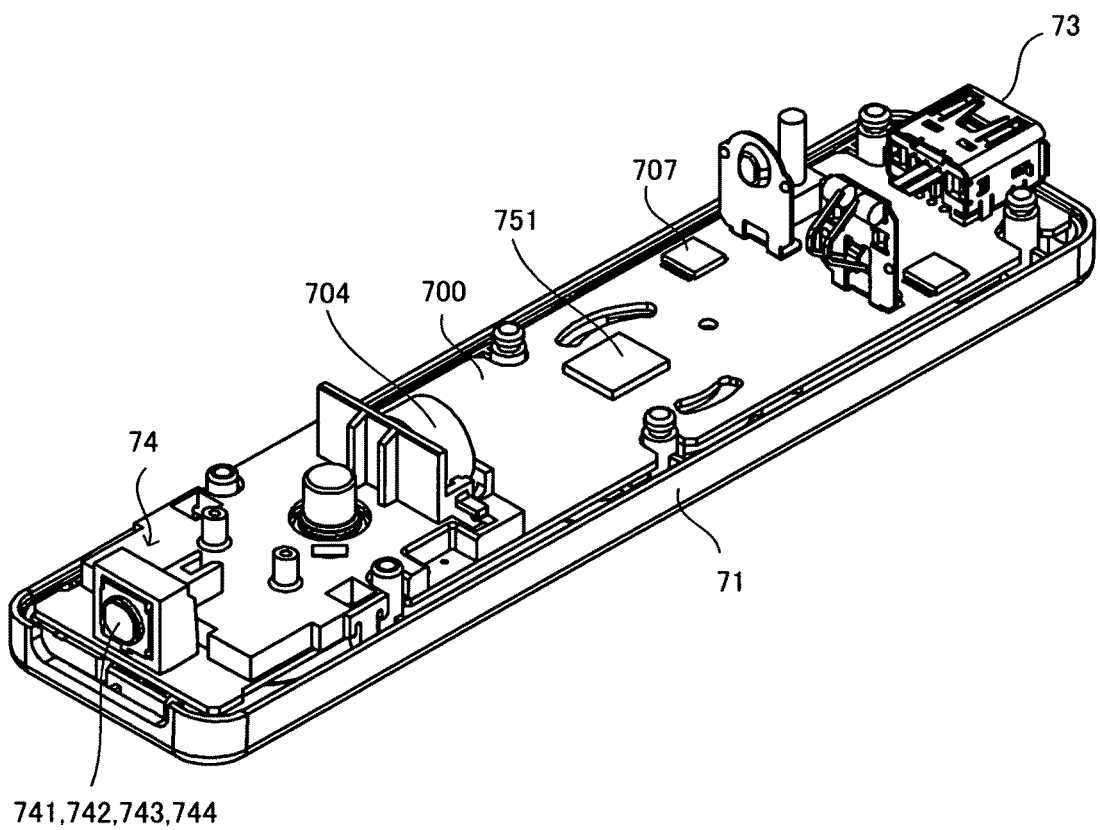
FIG. 6 is an isometric view illustrating a state where a lower casing of the controller 7 of FIG. 4 is removed.

Next, an internal structure of the controller 7 will be described with reference to FIGS. 5 and 6. FIG. 5 is an isometric view, seen from a rear surface side of the controller 7, illustrating a state where an upper casing (a part of the housing 71) of the controller 7 is removed. FIG. 6 is an isometric view, seen from a front surface side of the controller 7, illustrating a state where a lower casing (a part of the housing 71) of the controller 7 is removed. Here, FIG. 6 is an isometric view showing a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754 and the like are provided. These elements are connected to, e.g., a microcomputer 751 (see FIGS. 6 and 7) by wirings (not shown) formed on the substrate 700 and the like. The wireless module 753 (see FIG. 7) and antenna 754 allow the controller 7 to act as a wireless controller. Inside the housing 71, a quartz oscillator, which is not shown, is provided, and the quarts oscillator generates a reference clock of the later-described microcomputer 751. Further, the speaker 706 and an amplifier 708 are provided on the top main surface of the substrate 700.

The acceleration sensor 701 is provided, on the substrate 700, to the left side of the operation button 72d (i.e., provided not on a central portion but on a peripheral portion of the substrate 700). For this reason, in response to the controller 7 having rotated around an axis of a longitudinal direction of the controller 7, the acceleration sensor 701 is able to detect, in addition to a change in direction of gravitational acceleration, an acceleration containing centrifugal components, and the game apparatus body 5 or the like is able to determine, based on detected acceleration data, a motion of the controller 7 by a predetermined calculation with a favorable sensitivity. For example, the controller 7 has a three-axis acceleration sensor 701. The three-axis acceleration sensor 701 is able to detect linear acceleration of the controller 7 for three axial directions of the controller 7, i.e., an up-down direction, a left-right direction, and a front-rear direction. Data indicating the acceleration detected by the acceleration sensor 701 is outputted to the communication section 75.

As shown in FIG. 6, at a front edge of a bottom main surface of the substrate 700, the imaging information calculation section 74 is provided. The imaging information calculation section 74 comprises an infrared filter 741, a lens 742, the image pickup element 743 and an image processing circuit 744 which are located in said order from the front surface of the controller 7. These elements are attached to the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707 is connected to the microcomputer 751 and amplifier 708 by wirings formed on the substrate 700 and the like, and outputs audio signals via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 by wirings formed on the substrate 700 and the like, and is activated or deactivated in response to vibration data transmitted from the game apparatus body 5. The controller 7 is vibrated by an actuation of the vibrator 704, and the vibration is conveyed to the player's hand holding the controller 7. Thus, a so-called vibration-feedback game is realized. Since the vibrator 704 is provided at a relatively forward position in the housing 71, the housing 71 held by the player significantly vibrates, and allows the player to clearly feel the vibration.

Figure 7:
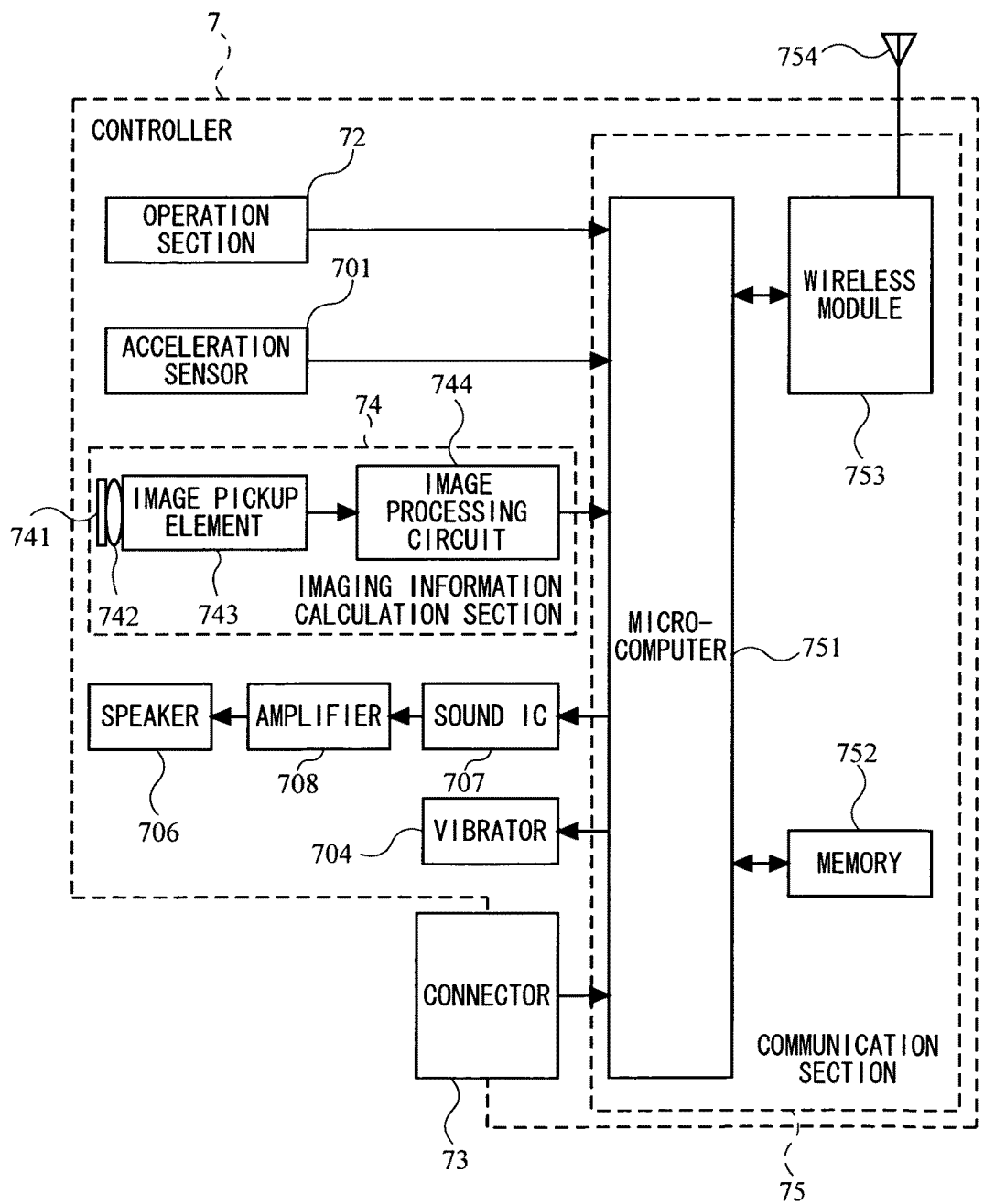
FIG. 7 is a block diagram showing a configuration of the controller 7 of FIG. 3.

Next, an internal configuration of the controller 7 will be described with reference to FIG. 7. FIG. 7 is a block diagram showing the configuration of the controller 7.

As shown in FIG. 7, in addition to the above-described operation sections 72, imaging information calculation section 74, acceleration sensor 701, vibrator 704, speaker 706, sound IC 707 and the amplifier 708, the controller 7 includes the communication section 75.

The imaging information calculation section 74 includes the infrared filter 741, lens 742, image pickup element 743 and the image processing circuit 744. The infrared filter 741 allows, among lights incident thereon through the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image, which area has a high brightness, and outputs, to the communication section 75, process result data indicating, e.g., position coordinates, square measure and the like detected from the area. The imaging information calculation section 74 is fixed to the housing 71 of the controller 7. An imaging direction of the imaging information calculation section 74 can be changed by changing a facing direction of the housing 71.

The communication section 75 includes the microcomputer 751, a memory 752, the wireless module 753 and the antenna 754. The microcomputer 751 controls the wireless module 753 for wirelessly transmitting transmission data while using the memory 752 as a storage area during processing. The microcomputer 751 also controls operations of the sound IC 707 and vibrator 704 in accordance with data which the wireless module 753 has received from the game apparatus body 5 via the antenna 754. The sound IC 707 processes sound data or the like transmitted from the game apparatus body 5 via the communication section 75. Further, the microcomputer 751 activates the vibrator 704 in accordance with vibration data or the like (e.g., a signal for causing the vibrator 704 to be ON or OFF) which is transmitted from the game apparatus body 5 via the communication section 75.

Data from the controller 7 such as operation signals (key data) from the operation sections 72, acceleration signals (acceleration data) from the acceleration sensor 701 with respect to the three axial directions, and the process result data from the imaging information calculation section 74 are outputted to the microcomputer 751. The microcomputer 751 temporarily stores inputted data (the key data, acceleration data and process result data) in the memory 752 as transmission data to be transmitted to the wireless controller module 19. Here, radio transmission from the communication section 75 to the wireless controller module 19 is performed at predetermined time intervals. Since the game processing is generally performed at a cycle of 1/60 sec, the radio transmission needs to be performed at a cycle of a shorter time period. Specifically, the game processing is performed at a cycle of 16.7 ms (1/60 sec), and a transmission interval of the communication section 75 structured using the Bluetooth (registered trademark) technology is 5 ms. At a timing of performing a transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, with a carrier wave having a predetermined frequency, a radio signal from the antenna 754, the radio signal indicating the series of pieces of operation information. Thus, the key data from the operation sections 72, the acceleration data from the acceleration sensor 701, and the process result data from the imaging information calculation section 74 are transmitted from the controller 7. The wireless controller module 19 of the game apparatus body 5 receives the radio signal, and the game apparatus body 5 demodulates or decodes the radio signal to obtain the series of pieces of operation information (the key data, acceleration data and process result data). In accordance with the series of pieces of obtained operation information and the game program, the CPU 10 of the game apparatus body 5 performs game processing. In the case where the communication section 75 is structured using the Bluetooth (registered trademark) technology, the communication section 75 can have a function of receiving transmission data wirelessly transmitted from other devices.

Prior to giving a specific description of processing performed by the game apparatus body 5, a brief description of a game process performed by the game apparatus body 5 and examples of game displays provided on the monitor 2 will be given with reference to FIGS. 8 to 11. As an example of the game process of the present invention, there is a mah-jong game to play against a plurality of characters. The game apparatus body 5 is capable of performing the game process in an online versus game mode in which a player-versus-player game proceeds in accordance with data communication performed with one or more other game apparatuses via a network or the like, or in a local versus game mode in which a player-versus-player game proceeds without performing data communication with other game apparatuses, i.e., the versus game proceeds only by the game apparatus body 5. In either game mode, in the game process, the versus game is performed among a player character controlled by a player using the controller 7 of the game apparatus body 5, one or more other player characters controlled by one or more other players, and/or one or more non-player characters controlled by the CPU 10.

Figure 8:
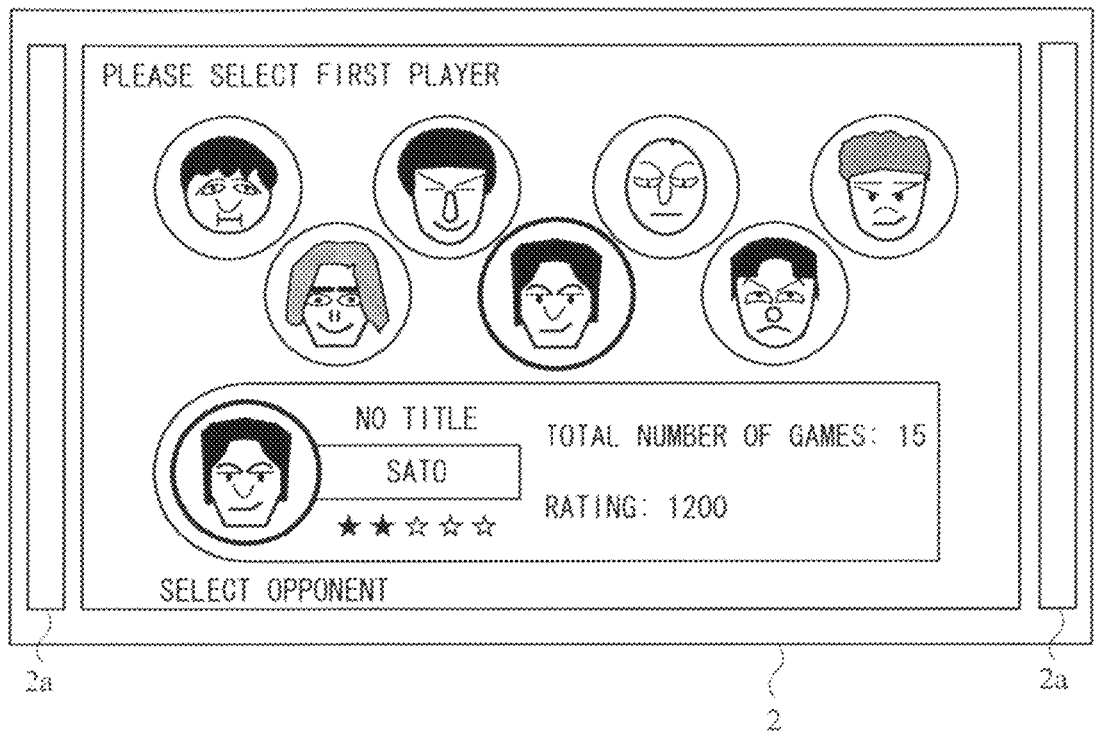
FIG. 8 is an example of a game display which is provided on a monitor 2 in accordance with a game process performed by the game apparatus body 5.

As shown in FIG. 8, the other player characters controlled by the other players and/or the non-player characters, who are possible opponents of the player, are displayed on the monitor 2 in the form of their respective portrait images. In the case of the local versus game mode, a portrait image to be selected as an opponent of the player can be selected from among character portraits which are registered in advance in the game apparatus body 5. Here, characters which are registered in advance in the game apparatus body 5 are, in addition to preset characters preinstalled in a game program of the mah-jong game, player characters which were used by other game apparatuses 3 when the player played against other players in the past in the online versus game mode (the example of FIG. 8 shows an opponent selection display in the local versus game mode). FIG. 8 shows that "Satoh" is selected as an opponent from among a plurality of portrait images.

In the case of the online versus game mode, the aforementioned character portraits, which are registered in advance in the game apparatus body 5, are displayed as possible opponents, and other than that, a player character, which is controlled by another player whom the player plays against for the first time by performing data communication with a game apparatus of said another player via a network or the like, can be selected. The player character controlled by said another player may be displayed, as a possible opponent, using a portrait of the player character of said another player, or only the name of the player character may be displayed as a possible opponent. A manner of displaying, as a possible opponent, the player character of said another player whom the player plays against for the first time, may be determined based on whether or not portrait data has already been received from said another player.

Hereinafter, a portrait created by the game apparatus 3 will be described. By operating the controller 7 while watching a portrait creating display provided on the monitor 2, the player of the game apparatus 3 can create a player character object (portrait image) which represents the player. For example, the player of the game apparatus 3 selects a part object for each part of the portrait from among a plurality of types of part objects prepared in advance for each part of the portrait, and composites the selected part objects, thereby creating the portrait which represents the player. Data indicating the portrait created by the player (portrait data) is stored in the game apparatus body 5 operated by the player. The portrait created by the player may be used as a face of the player character appearing in a virtual game world created by the game apparatus body 5 executing a game program.

In the case where characters appear, using such portraits as above, in a game which proceeds in accordance with communication performed by the game apparatus 3 with other game apparatuses 3, the portrait data of the player character of the game apparatus 3 is registered in the other game apparatuses 3. Note that, in data communication performed between game apparatuses 3, portrait data generated by one game apparatus 3 is transmitted to the other game apparatus 3, and the portrait data received by the other game apparatus 3 is registered in the other game apparatus 3. Accordingly, the game apparatus body 5 is able to, even after the communication with the other game apparatuses 3 is disconnected, perform a game play, information processing or the like by using portrait data which has previously been created by the other game apparatuses 3 and which has already been registered in the game apparatus body 5. Note that, in the present invention, operation tendency data (herein after, referred to as habit data), which indicates a tendency in operations performed by the player and which is generated based on actions of the player character performed in response to the operations by the player, is transmitted to the other game apparatuses 3 together with the portrait data of the player character.

Figure 9:
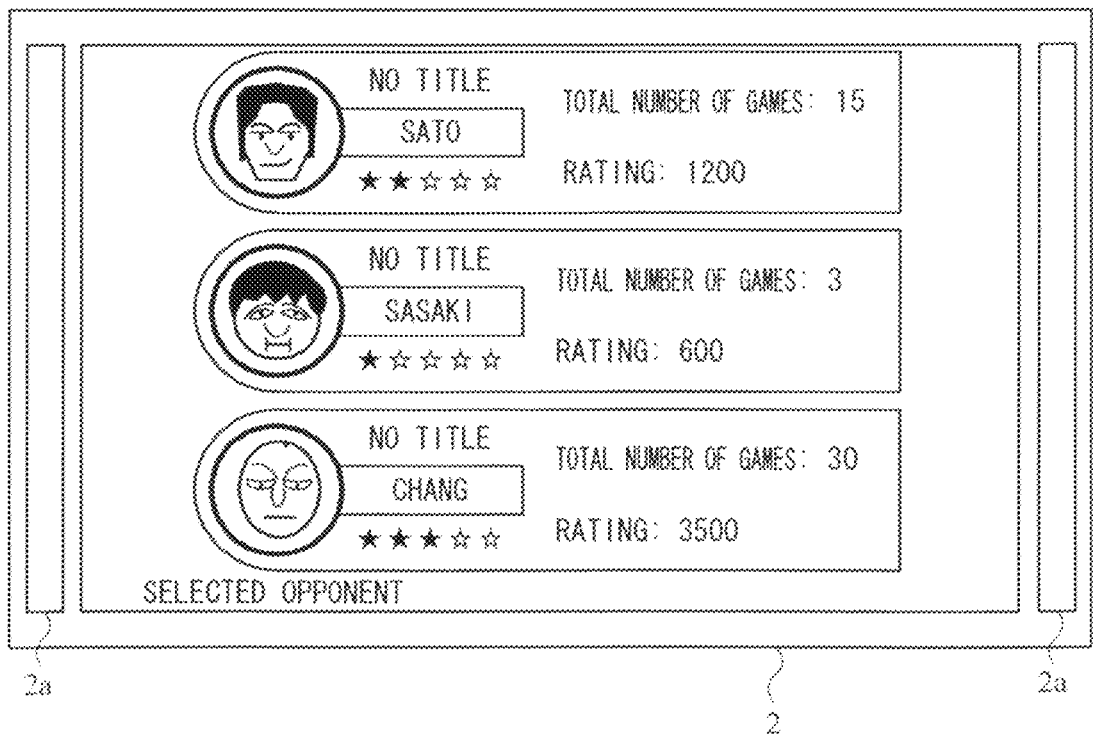
FIG. 9 is an example of a game display which is provided on the monitor 2 in accordance with the game process performed by the game apparatus body 5.

As a result of the player sequentially selecting opponents from among a plurality of possible opponents displayed in the monitor 2, three opponents for the mah-jong game are determined. The game display example in FIG. 9 shows that non-player characters "Satoh", "Sasaki" and "Chang" displayed with their respective portraits are determined as the three opponents.

Figure 10:
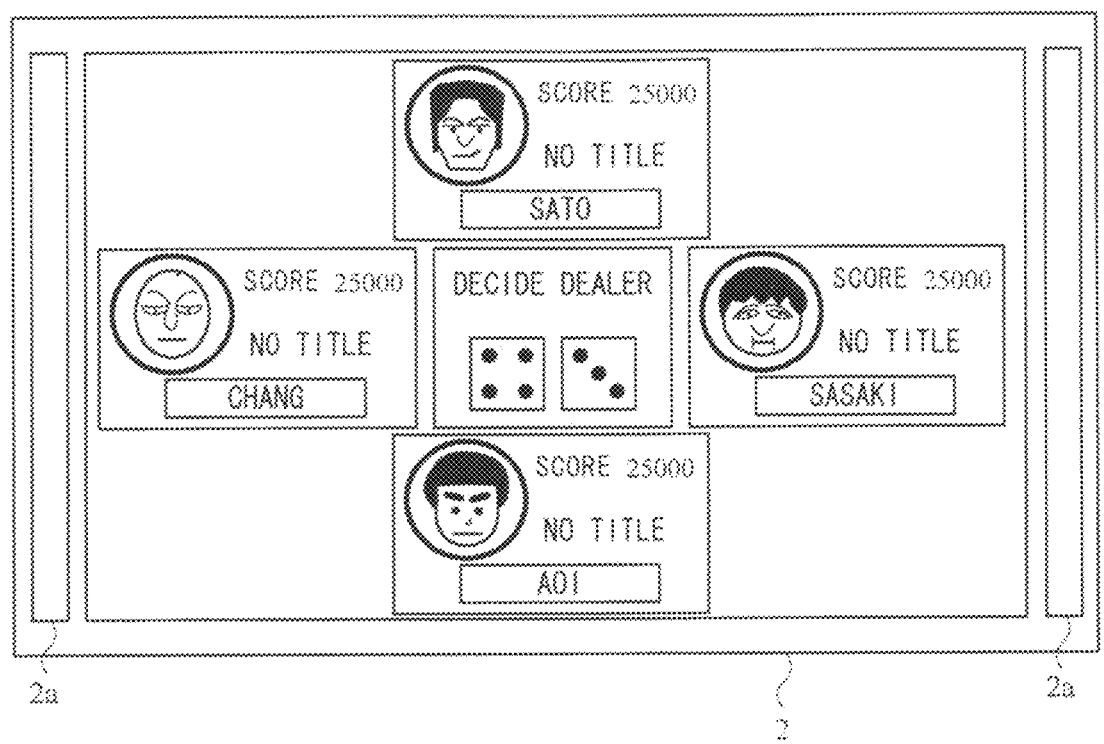
FIG. 10 is an example of a game display which is provided on the monitor 2 in accordance with the game process performed by the game apparatus body 5.
Figure 11:
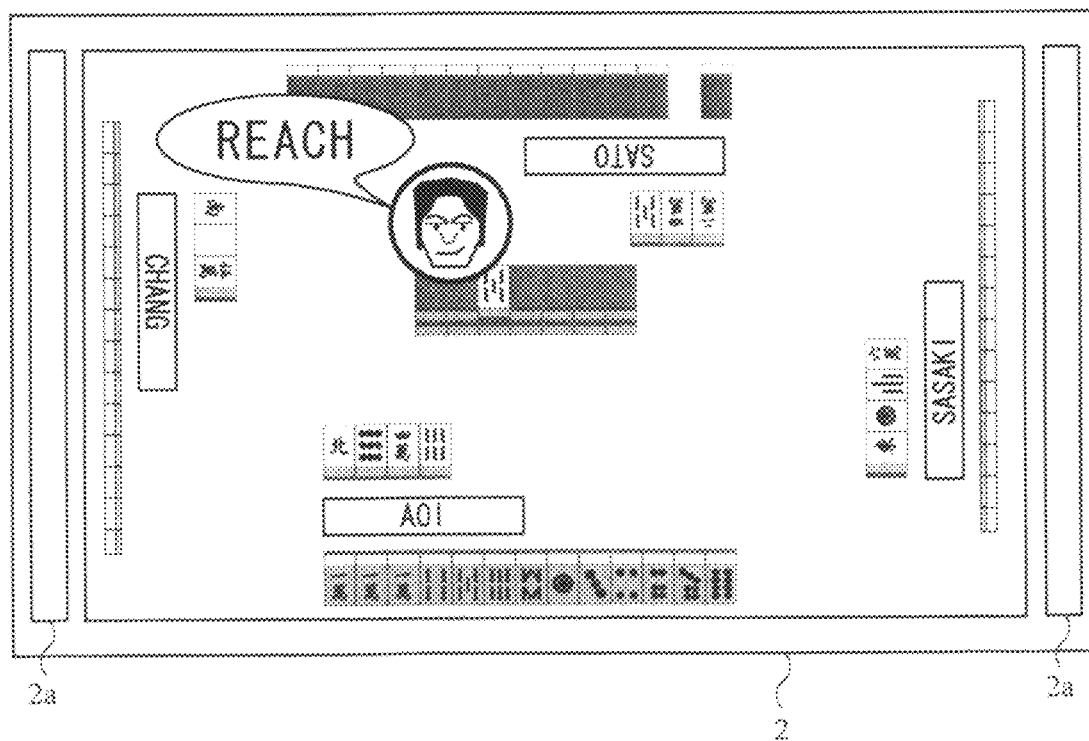
FIG. 11 is an example of a game display which is provided on the monitor 2 in accordance with the game process performed by the game apparatus body 5.

Next, a player-versus-player game against the three opponents starts as shown in FIG. 10. In FIG. 10, a player character "Aoi" together with a portrait thereof is displayed as a player character who plays against the aforementioned non-player characters in the player-versus-player game. Typically, the portrait of the player character "Aoi" is a portrait image which has been created and registered in advance so as to represent the player operating the game apparatus body 5. During the player-versus-player game, portrait images of the player character and the non-player characters, always or as necessary, appear in the virtual game world for display (FIG. 11). Displaying the portrait images of the opponent players allow the player to feel as if to be really playing against the opponent players.

During the player-versus-player game, actions of each of the player character controlled by the player and the player characters controlled by the other players are determined in accordance with operations performed by a corresponding player. The CPU 10 controls actions of a non-player character which is not controlled by any player, based on the habit data which is registered together with the portrait data of the non-player character. By controlling, in this manner, the actions of an opponent based on the habit data of a player who previously controlled the opponent, the player of the game apparatus body 5 is allowed to feel as if to be really playing against the opponent player. Note that, a manner of generating the habit data and a manner of controlling actions based on the habit data, will be described later.

Next, the game process performed by the game system 1 will be described in detail. Hereinafter, in order to give a specific description, an example of a mah-jong game, in which the player character controlled by the player plays against a plurality of non-player characters and/or other player characters, will be given.

Figure 15:
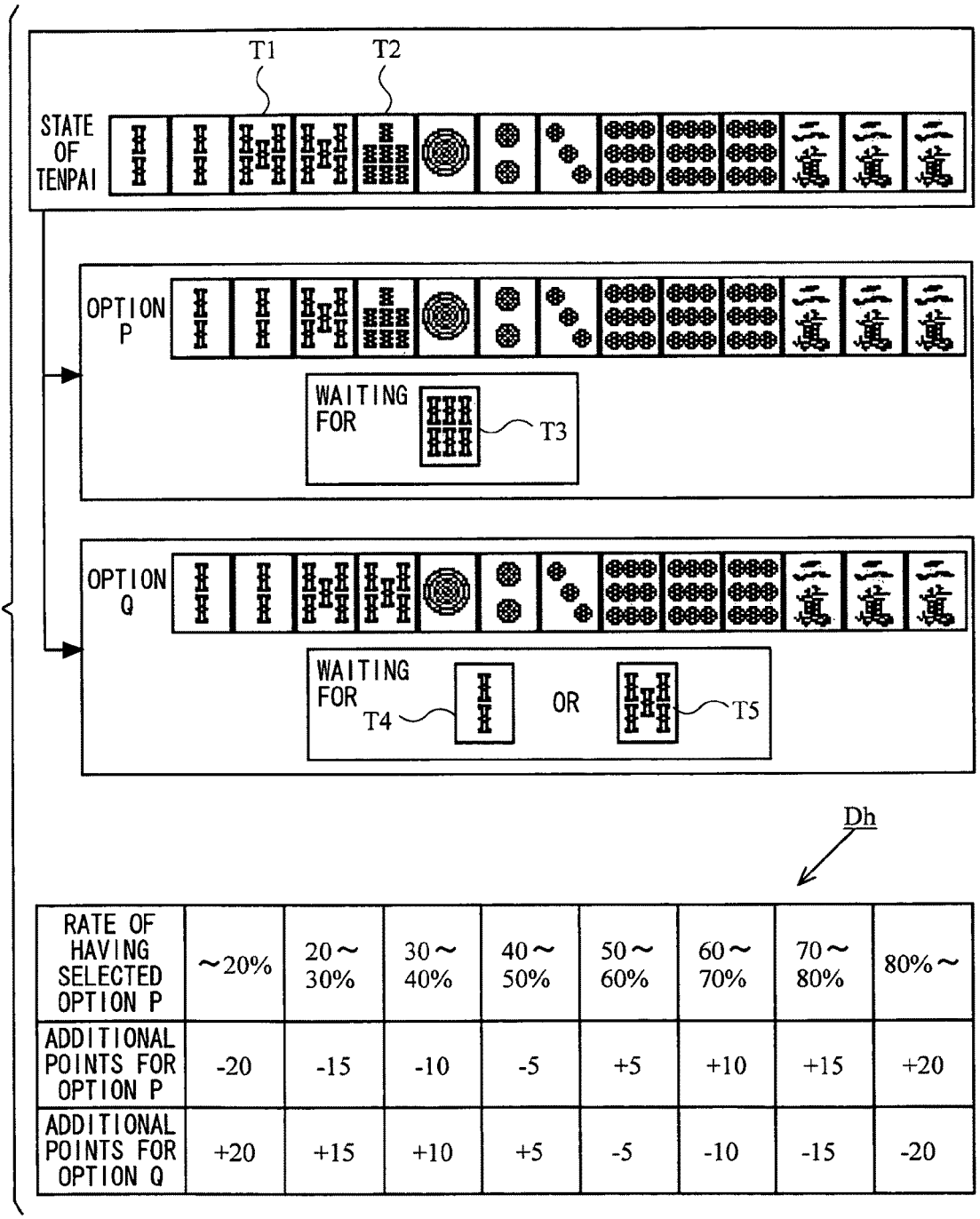
FIG. 15 shows exemplary data showing a specific situation additional point calculation table, which is contained in the habit data calculation table data Dh of FIG. 12, and shows an exemplary specific situation.

With reference to FIGS. 12 to 17, main data to be used in the game process will be described. FIG. 12 shows an example of the main data which is stored in the external main memory 12 and/or in the internal main memory 35 of the game apparatus body 5 (herein after, these two main memories are collectively referred to as a main memory) and in the flash memory 17. FIG. 13 shows exemplary data showing a coefficient A calculation table, which is contained in habit data calculation table data Dh. FIG. 14 shows exemplary data showing a coefficient B calculation table, which is contained in the habit data calculation table data Dh. FIG. 15 shows exemplary data showing a specific situation additional point calculation table, which is contained in the habit data calculation table data Dh, and also shows an exemplary specific situation. FIG. 16 shows exemplary data showing a safety basic point calculation table, which is contained in basic point calculation table data Di. FIG. 17 shows exemplary data showing a winning probability basic point calculation table, which is contained in the basic point calculation table data Di.

As shown in FIG. 12, the main memory and the flash memory 17 store operation information data Da, player portrait data Db, player habit data Dc, opponent portrait data Dd, opponent habit data De, preset character portrait data Df, preset character habit data Dg, habit data calculation table data Dh, basic point calculation table data Di, evaluation point data Dj, highest point data Dk, statistical information data Dl, image data Dm and the like. Note that, although the main memory and the flash memory 17 store, in addition to the data shown in FIG. 12, data necessary for various processing such as data for performing the game process or data for performing other processes, descriptions thereof will be omitted.

The operation information data Da contains data showing a series of operation information (key data, acceleration data and process result data) transmitted as transmission data from the controller 7. Note that, the wireless controller module 19 of the game apparatus body 5 receives the operation information which is transmitted from the controller 7 at predetermined intervals (e.g., every 1/200 sec), and stores the operation information in a buffer (not shown) of the wireless controller module 19. Thereafter, most recently stored operation information in the buffer is read every frame (e.g., every 1/60 sec) which is a game process cycle, and the operation information Da is updated accordingly.

The player portrait data Db contains data indicating the portrait image which the player has created so as to represent the player. The player habit data Dc contains data indicating the player's habit, which is generated based on actions of the player character performed in response to operations by the player. For example, the player habit data Dc contains, as habit data, data indicating a coefficient A, a coefficient B, specific situation additional points, and the like. Descriptions of these data will be provided later in detail.

The opponent portrait data Dd contains data indicating a portrait image which another player, i.e., an opponent, has created so as to represent said another player. The opponent habit data De contains data indicating a habit of the opponent (i.e., said another player), which is generated based on actions of a character performed in response to operations by said another player. For example, as the habit data of the opponent (i.e., said another player), the opponent habit data De contains data indicating the coefficient A, the coefficient B, the specific situation additional points and the like of the opponent. Descriptions of these data will be provided later in detail.

The preset character portrait data Df stores data indicating a portrait image of a preset character created in advance. The preset character habit data Dg contains data indicating a habit of the preset character created in advance. For example, the preset character habit data Dg also contains, as the habit data of the preset character, data indicating the coefficient A, the coefficient B, the specific situation additional points and the like of the preset character.

The habit data calculation table data Dh contains data which is used to derive the habit data of the player (the coefficients A and B, specific situation additional points and the like) from statistical values or the like obtained in each player-versus-player game, such as statistical values which are obtained from each entire player-versus-player game and which are obtained from actions of the player character performed in response to operations by the player, and local statistical values which are obtained from a specific situation in each player-versus-player game and which are obtained from actions of the player character performed in response to operations by the player in the specific situation.

For example, as shown in FIG. 13, the habit data calculation table data Dh contains data showing the coefficient A calculation table in which the coefficient A set for each furikomi rate of the player is written. Here, a furikomi rate is a value which indicates a proportion of, in the total number of games which the player has played, the number of games where the player character has done "furikomi" (furikomi is a situation where the player character discards a tile, and an opponent takes the discarded tile and thereby wins the game). For example, the coefficient A calculation table in FIG. 13 shows: the coefficient A=2.0 is assigned in the case where the furikomi rate is 11% or lower; the coefficient A=1.5 is assigned in the case where the furikomi rate is no lower than 11% and lower than 13%; the coefficient A=1.0 is assigned in the case where the furikomi rate is no lower than 13% and lower than 15%; the coefficient A=0.8 is assigned in the case where the furikomi rate is no lower than 15% and lower than 18%; the coefficient A=0.5 is assigned in the case where the furikomi rate is no lower than 18% and lower than 21%; and the coefficient A=0.0 is assigned in the case where the furikomi rate is no lower than 21%. As is clear from the description below, the coefficient A is a parameter which indicates how much importance the player places on the safety against "furikomi".

As shown in FIG. 14, the habit data calculation table data Dh contains data which shows the coefficient B calculation table in which the coefficient B set for each winning rate of the player is written. Here, an winning rate is a value which indicates a proportion of, in the total number of games which the player has played, the number of games which the player character has "won" (here, to win a game means to show the opponents the player's hand which satisfies a particular condition or rules and obtain points in accordance with rules). For example, the coefficient B calculation table in FIG. 14 shows: the coefficient B=0.4 is assigned in the case where the winning rate is lower 18%; the coefficient B=0.6 is assigned in the case where the winning rate is no lower than 18% and lower than 20%; the coefficient B=0.8 is assigned in the case where the winning rate is no lower than 20% and lower than 22%; the coefficient B=1.0 is assigned in the case where the winning rate is no lower than 22% and lower than 24%; the coefficient B=1.2 is assigned in the case where the winning rate is no lower than 24% and lower than 26%; the coefficient B=1.4 is assigned in the case where the winning rate is no lower than 26% and lower than 28%; and the coefficient B=1.6 is assigned in the case where the winning rate is no lower than 28%. As is clear from the description provided below, the coefficient B is a parameter which indicates the player's motivation to "win".

As shown in FIG. 15, the habit data calculation table data Dh contains data showing the specific situation additional point calculation table in which additional points are written, which additional points are set in relation to rates of having selected, by the player, a particular option in a specific situation in the player-versus-player game. For example, in the case where the player is "tenpai" (i.e., the player's hand is one tile short of wining) as shown in FIG. 15, the player is still "tenpai" if the player discards either a tile T1 (five bamboo sticks) or a tile T2 (seven bamboo sticks). Here, if the player discards the tile T1, a tile which allows the player to "win" (i.e., a tile which the player is "waiting" for) is a tile T3 (six bamboo sticks) as shown in an option P. This state is so-called "kanchan-machi" ("kanchan-machi" is a state where a combination of tiles of sequential numbers lacks a middle tile. The player is able to "win" by obtaining the middle tile). On the other hand, if the player discards the tile T2, a tile which allows the player to "win" is a tile T4 (two bamboo sticks) or a tile T5 (five bamboo sticks) as shown in an option Q. This state is so-called "shanpon-machi" ("shanpon-machi" is a state where there are two different pairs of same tiles. The player is able to "win" by obtaining a tile which completes either combination of same three tiles). Thus, in the above "tenpai" state, the player has two options. The player's different favorite "waiting" situations appear depending on what tile the player discards. Here, in the above "tenpai" state, if the player performs an operation to discard the tile T1, this means that the player favorably selects the option P (i.e., "kanchan-machi"), whereas if the player performs an operation to discard the tile T2, this means that the player favorably selects the option Q (i.e., "shanpon-machi"). The present embodiment focuses on a situation where the player makes a selection from such options as above, as an example of a specific situation where the player's habit is seen.

Written in the specific situation additional point calculation table are additional points for the option P and additional points for the option Q which are both set in relation to rates of having selected, by the player, the option P in such a specific situation as above. For example, the specific situation additional point calculation table in FIG. 15 shows: the additional points for the option P=−20 and the additional points for the option Q=+20 are assigned in the case where the rate of having selected the option P is lower than 20%; the additional points for the option P=−15 and the additional points for the option Q=+15 are assigned in the case where the rate of having selected the option P is no lower than 20% and lower than 30%; the additional points for the option P=−10 and the additional points for the option Q=+10 are assigned in the case where the rate of having selected the option P is no lower than 30% and lower than 40%; the additional points for the option P=−5 and the additional points for the option Q=+5 are assigned in the case where the rate of having selected the option P is no lower than 40% and lower than 50%; the additional points for the option P=+5 and the additional points for the option Q=−5 are assigned in the case where the rate of having selected the option P is no lower than 50% and lower than 60%; the additional points for the option P=+10 and the additional points for the option Q=−10 are assigned in the case where the rate of having selected the option P is no lower than 60% and lower than 70%; the additional points for the option P=+15 and the additional points for the option Q=−15 are assigned in the case where the rate of having selected the option P is no lower than 70% and lower than 80%; and the additional points for the option P=+20 and the additional points for the option Q=−20 are assigned in the case where the rate of having selected the option P is no lower than 80%. As is clear from the description below, the above additional points are parameters which indicate the player's tendency in a specific situation.

The basic point calculation table data Di contains data which is used to derive safety basic points and winning probability basic points which are used for calculating evaluation points of each possible move.

For example, as shown in FIG. 16, the basic point calculation table data Di contains data showing the safety basic point calculation table in which safety basic points are written, which safety basic points are set so as to each correspond to a combination of a tile to be discarded by a possible move of the player and a state of an opponent. For example, types of discarded tiles are categorized into: "genbutsu" (a same tile as a tile discarded by the opponent); "suji" (a numbered tile which is different in number by 3 from "genbutsu") or "kabe" (when four tiles of a same type are shown on the field, a numbered tile having a close number to these tiles is "kabe"); and "others", and a safety level of each category is quantified. Also, states of the opponent are categorized into: "calling" (to "call" is to show a part of the player's hand to the opponents, and add to the player's hand a tile discarded by an opponent); "getting a reach" (to "get a reach" is to declare "tenpai" to the opponents when the player has become "tenpai" without "calling"); and "others", and a safety level of each category is quantified. For example, the safety basic point calculation table in FIG. 16 shows: in the case where the player's discarded tile is "genbutsu", the safety basic point=0 is assigned for all the states of the opponent; in the case where the discarded tile is "suji" or "kabe", the safety basic points=−20 are assigned when the state of the opponent is "reach", and the safety basic points=−4 are assigned when the state of the opponent is "calling", and the safety basic point=0 is assigned when the state of the opponent is "others"; in the case where the discarded tile is "others", the safety basic points=−60 are assigned when the state of the opponent is "reach", and the safety basic points=−10 are assigned when the state of the opponent is "calling", and the safety basic points=−2 are assigned when the state of the opponent is others. As is clear from the description below, the safety basic points are a parameter which indicates a safety level of the discarded tile in the player-versus-player game (i.e., the more dangerous the discarded tile is in relation to the opponent, the greater the negative value of the parameter).

As shown in FIG. 17, the basic point calculation table data Di contains data showing an winning probability basic point calculation table in which winning probability basic points are written, which winning probability basic points are set so as to each correspond to the number of necessary tiles for the player to become "tenpai". For example, the winning probability basic point calculation table in FIG. 17 shows: the winning probability basic points=250 are assigned in the case where the player is tenpai, i.e., in the case where the number of necessary tiles to become tenpai=0; the winning probability basic points=150 are assigned in the case where the number of necessary tiles to become tenpai=1; the winning probability basic points=80 are assigned in the case where the number of necessary tiles to become tenpai=2; the winning probability basic points=30 are assigned in the case where the number of necessary tiles to become tenpai=3; the winning probability basic points=4 are assigned in the case where the number of necessary tiles to become tenpai=4; the winning probability basic points=2 are assigned in the case where the number of necessary tiles to become tenpai=5; and the winning probability basic point=0 is assigned in the case where the number of necessary tiles to become tenpai≧6. As is clear from the description below, the winning probability basic points are a parameter which indicates a degree of closeness to "win" the player-versus-player game (i.e., the closer to the "win" the player's hand becomes by the move, the greater the positive value of the parameter).

The evaluation point data Dj contains data showing evaluation points E calculated for possible respective moves. The highest point data Dk contains data indicating, among the evaluation points E calculated for the possible respective moves, maximum evaluation points (highest points Ebest). The statistical information data Dl contains data indicating statistical information about the player, which statistical information is obtained from the player-versus-player game which the player has played. The image data Dm contains various image data for creating a virtual game world on a display device (monitor 2).

Figure 18:
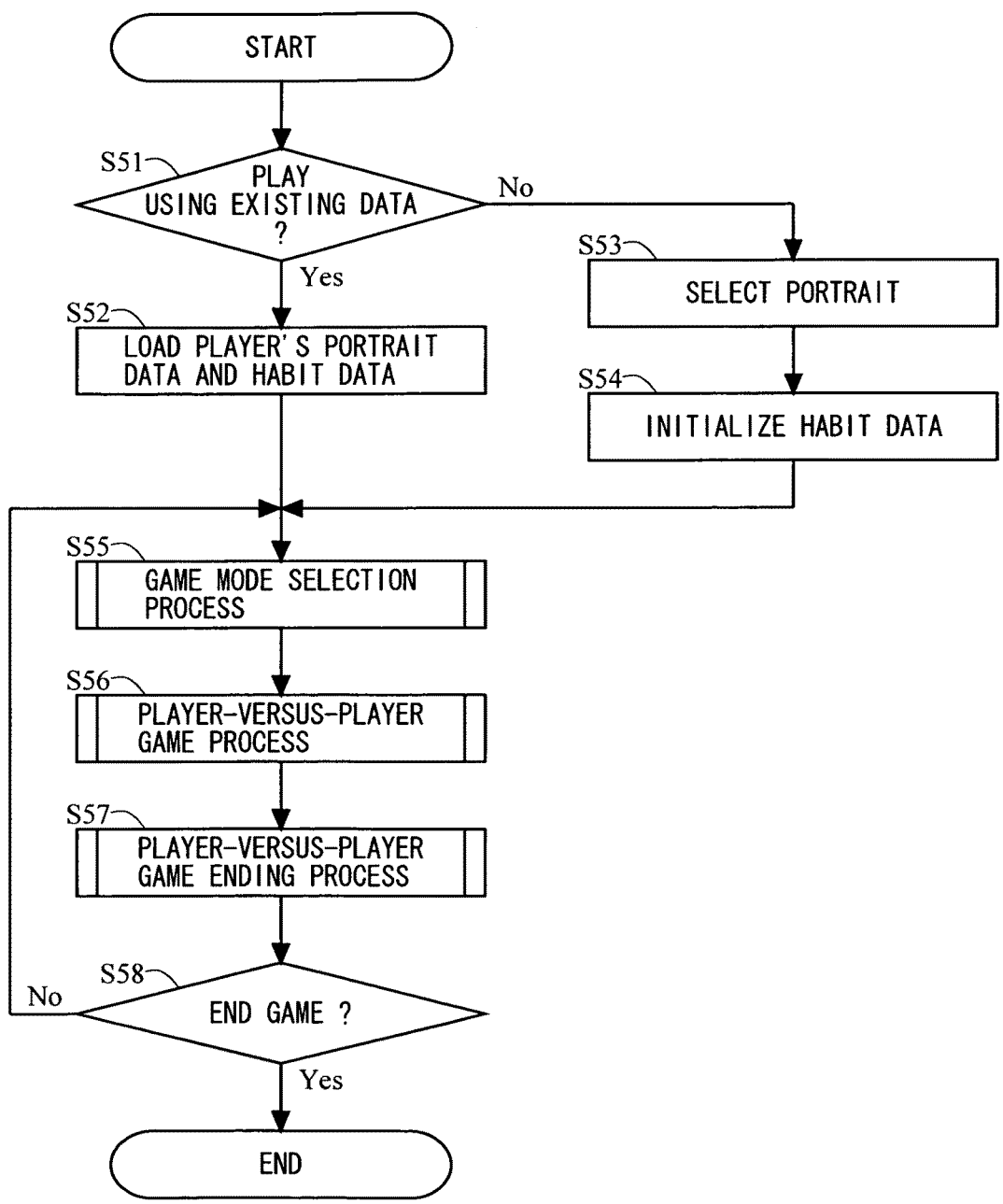
FIG. 18 is a flowchart showing an exemplary flow of the game process performed by the game apparatus body 5.
Figure 19:
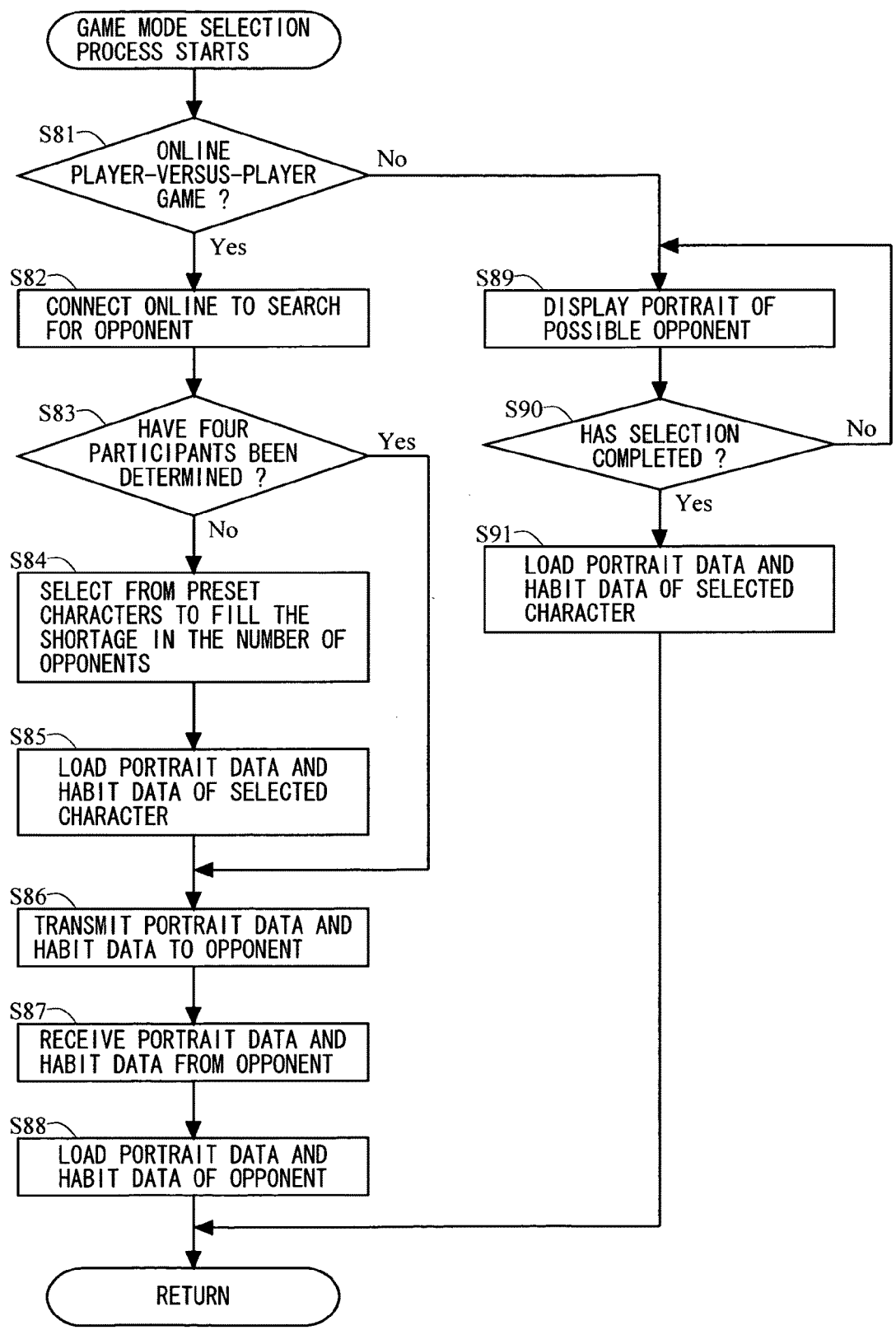
FIG. 19 is a subroutine showing in detail operations performed in a game mode selection process at step 55 of FIG. 18.
Figure 20:
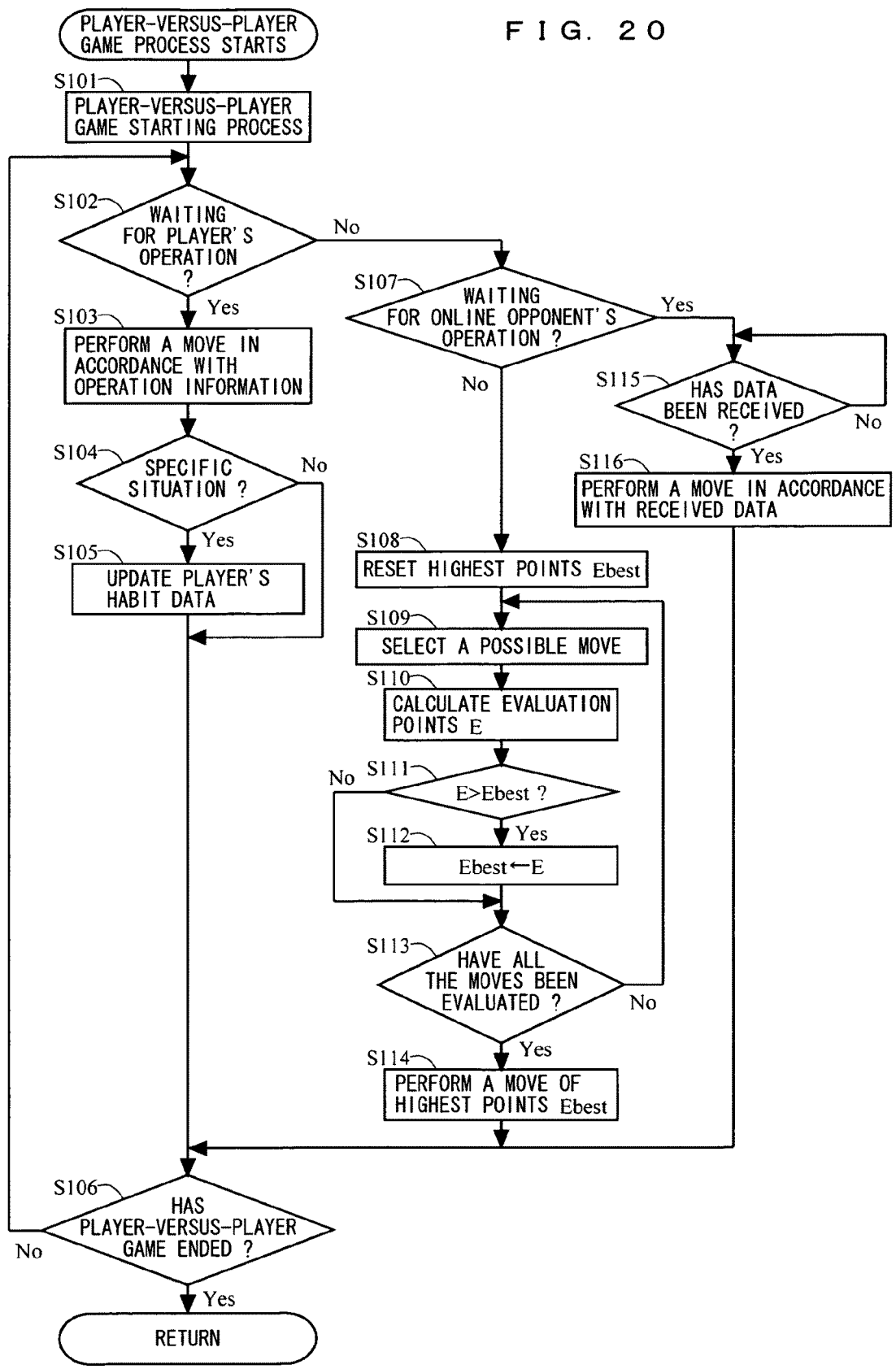
FIG. 20 is a subroutine showing in detail operations performed in a player-versus-player game process at step 56 of FIG. 18.
Figure 21:
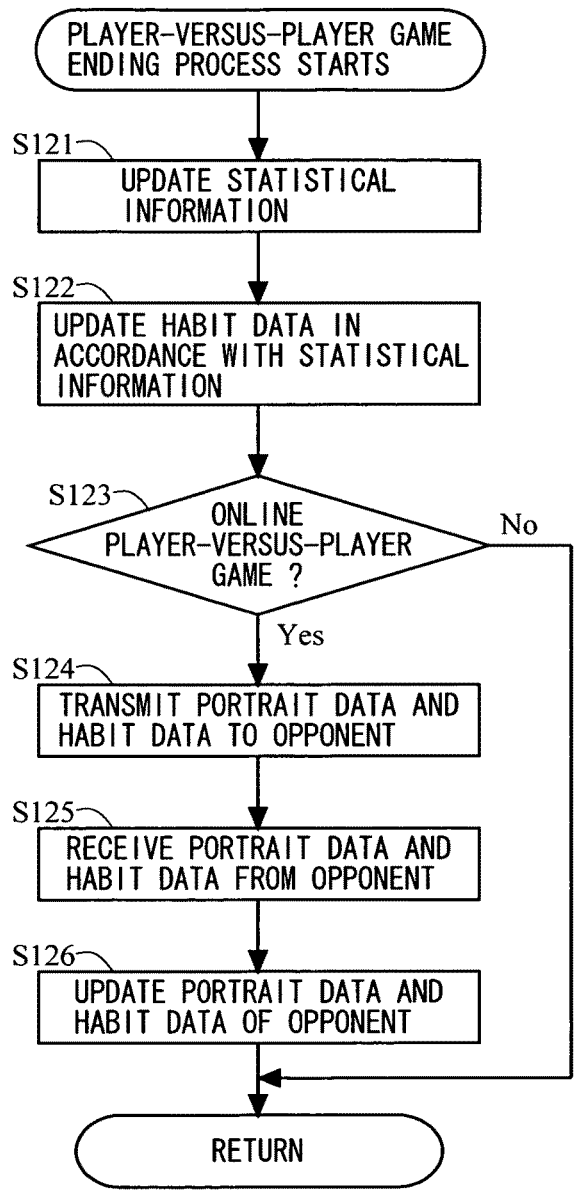
FIG. 21 is a subroutine showing in detail operations performed in a player-versus-player game ending process at step 57 of FIG. 18.

Next, with reference to FIGS. 18 to 21, the game process performed by the game apparatus body 5 will be described in detail. Note that, FIG. 18 is a flowchart showing an exemplary flow of the game process performed by the game apparatus body 5. FIG. 19 is a subroutine showing in detail operations which are performed in a game mode selection process at step 55 of FIG. 18. FIG. 20 is a subroutine showing in detail operations which are performed in a player-versus-player game process at step 56 of FIG. 18. FIG. 21 is a subroutine showing in detail operations which are performed in a player-versus-player game ending process at step 57 of FIG. 18. Note that, only processes in the game process, which allow the player-versus-player game to proceed, are described with reference to the flowchart shown in FIGS. 18 to 21, and detailed descriptions of other processes in the game process, which are not directly relevant to the present invention, will be omitted. In FIGS. 18 to 21, each step performed by the CPU 10 will be abbreviated as "S".

When the power button 24 of the game apparatus body 5 is turned on, the game apparatus body 5 shifts from the state of completely being turned off or from the aforementioned power-saving stand-by mode to a normal processing mode. Then, the CPU 10 of the game apparatus body 5 executes a boot program stored in the ROM/RTC 13, whereby each unit such as the main memory is initialized. In the case where the optical disc 4 is inserted, a game program stored in the optical disc 4 is loaded to the main memory, whereby an execution of the game program by the CPU 10 is enabled. The flowchart in FIG. 18 shows the game process which is performed after the above process is completed.

In FIG. 18, the CPU 10 determines whether or not the player has selected a player-versus-player game in which existing data is used (step 51). Here, the player is able to, by selecting his/her portrait and habit data which are already saved, cause the player character to appear using the existing portrait. In this case, the player operates the controller 7 to select his/her portrait, thereby determining the player character. The player is also able to start the player-versus-player game with a new player character. At the above step 51, the CPU 10 refers to the operation information data Da to determine what selection the player has made, thereby determining whether or not to play the player-versus-player game using the existing data. In the case of playing the versus game using the existing data, the CPU 10 proceeds to a process at a next step 52. On the other hand, in the case of playing the versus game using new data, the CPU 10 proceeds to a process at a next step 53.

At step 52, the CPU 10 updates the player portrait data Db and the player habit data Dc, by using preset portrait data and habit data of the player. Then, the CPU 10 proceeds to a process at a next step 55.

At step 53, on the other hand, the CPU 10 refers to the operation information data Da to set a portrait selected by the player as a new player character, and then updates the player portrait data Db. Thereafter, the CPU 10 initializes the habit data of the player, and updates the player habit data Dc by using the initialized habit data (step 54). Then, the processing proceeds to the next step 55. For example, at the above step 54, the CPU 10 initializes the habit data such that a habit indicated by the habit data is flat, i.e., the habit data does not indicate any particular habit.

At step 55, the CPU 10 performs the game mode selection process, and proceeds to a process at a next step. Hereinafter, operations performed in the game mode selection process will be described in detail with reference to FIG. 19.

In FIG. 19, the CPU 10 refers to the operation information data Da to determine whether or not the player has selected an online player-versus-player game (step 81). When the online versus game has been selected, the CPU 10 proceeds to a process at a next step 82. On the other hand, when a local player-versus-player game has been selected, the CPU proceeds to a process at a next step 89.

At step 82, the CPU 10 searches for possible opponents, by accessing a server in which opponents to whom the player can be connected via a network are registered, and displays the possible opponents on the monitor 2. Next, the CPU 10 determines whether or not four participants of the versus game, including the player character controlled by the player, have been determined (step 83). When the number of participants playing against each other via the network is less than 4, the CPU 10 proceeds to a process at a next step 84. On the other hand, when four participants playing against each other via the network have been determined, the CPU 10 proceeds to a process at a next step 86.

At step 84, the CPU 10 randomly selects an opponent (or opponents) from preset characters, in order to fill the shortage in the number of opponents. Then, the CPU 10 updates the preset character portrait data Df and the preset character habit data Dg by using the portrait data and the habit data set for the selected preset character (step 85), and proceeds to a process at the next step 86.

At step 86, via the network, the CPU 10 transmits the portrait data and the habit data of the player contained in the player portrait data Db and the player habit data Dc, to the game apparatuses 3 of the opponents whom the player plays against via the network. Next, the CPU 10 receives the portrait data and the habit data transmitted from the game apparatuses 3 of the opponents whom the player plays against via the network (step 87). Thereafter, the CPU 10 updates the opponent portrait data Dd and the opponent habit data De by using the received portrait data and the habit data of the opponents (step 88), and then ends the processing of the subroutine.

On the other hand, in the case where the local player-versus-player game is selected at the above step 81, the CPU 10 displays, on the monitor 2, portraits of registered possible opponents (step 89; see FIG. 8). Here, the portraits displayed at step 89 include portraits of player characters which were used in the past by other game apparatuses 3 when the game apparatus 3 played against the other game apparatuses in the online versus game mode. Then, the CPU 10 refers to the operation information data Da, and if the selection of the opponents by the player has been completed (Yes at step 90), the CPU 10 updates the opponent portrait data Dd and the opponent habit data De by using the portrait data and the habit data of the selected opponents (step 91), and then ends the processing of the subroutine.

Return to FIG. 18. After the game mode selection process at the above step 55, the CPU 10 performs the player-versus-player game process (step 56), and then proceeds to a process at a next step. Hereinafter, operations performed in the player-versus-player game process at step 56 will be described in detail with reference to FIG. 20.

As shown in FIG. 20, the CPU 10 performs a player-versus-player game starting process, thereby starting a player-versus-player game (step 101), and then proceeds to a process at a next step. For example, in the player-versus-player game starting process, in addition to an initial setting process for starting the versus game, e.g., a process for displaying on the monitor 2 a virtual game world in which the portraits of the player and the opponents appear, an initial setting process specific to a mah-jong game is performed (e.g., for deciding a dealer, deciding a seating position of each player character, and assigning tiles to each player character as shown in FIG. 10). Accordingly, at the above step 101, data indicating operation information about operations performed by the plurality of game apparatuses 3, and the like are transmitted/received online. However, detailed descriptions thereof will be omitted.

Next, the CPU 10 determines whether or not the current state is waiting for the player to perform an operation (step 102). When the current state is waiting for the player to perform an operation, the CPU 10 proceeds to a process at a next step 103. On the other hand, when the current state is not waiting for the player to perform an operation, the CPU 10 proceeds to a process at a next step 107.

At step 103, the CPU 10 updates the operation information data Da by obtaining, from the controller 7, data indicating a series of operation information, and causes the player character to perform an action in accordance with the operation information. Then, the processing proceeds to a next step. For example, the CPU 10 causes, in response to an operation by the player, the player character to perform an action, e.g., "select and discard a tile from his/her hand", "call for a tile discarded by an opponent", "pass on a tile discarded by an opponent" and "complete his/her hand and declare a win". Note that, in the case where an online opponent (i.e., another player who operates a game apparatus 3 in an online versus play) is participating in the currently played player-versus-player game, the CPU 10 transmits, to the online opponent, the obtained operation information or data indicating the action performed by the player character.

Next, the CPU 10 determines whether or not the current situation of the player-versus-player game is a specific situation (step 104). Here, the specific situation is such a situation in the mah-jong game as described above where the player's habit is likely to appear. Such a situation is preset as the specific situation. The CPU 10 determines whether or not the current situation of the game is the present specific situation. If the current situation is the specific situation, the CPU 10 proceeds to a process at a next step 105. On the other hand, if the current situation is not the specific situation, the CPU 10 proceeds to a process at a next step 106.

At step 105, the player habit data Dc is updated in accordance with the action performed by the player character at the above step 103, and then the processing proceeds to a next step 106. For example, in the specific situation described with reference to FIG. 15, the specific situation additional points are updated in accordance with a change in the rate of having selected, by the player character, the action of the option P. Then, the CPU 10 updates, from among the player habit data Dc, data indicating the specific situation additional points.

On the other hand, at the above step 102, when the current situation is not waiting for the player to perform an operation, the CPU 10 determines whether or not the current situation is waiting for an online opponent to perform an operation (step 107). When the current situation is not waiting for the online opponent to perform an operation, the CPU 10 determines that it is a turn of a non-player character operated by the CPU 10, and then proceeds to a process at a next step 108. Whereas, when the current situation is waiting for the online opponent to perform an operation, the CPU 10 proceeds to a process at a next step 115.

At step 108, the CPU 10 initializes the highest points Ebest, thereby updating the highest point data Dk. The CPU 10 then selects a possible move based on the non-player character's current hand (step 109), and updates the evaluation point data Dj by calculating the evaluation points E for the selected move (step 110). Then, the processing proceeds to a next step.

Hereinafter, the evaluation points E calculated at the above step 110 will be described. For example, the evaluation points E are calculated such that: basic points are calculated for elements of the currently selected move of the non-player character; the calculated basic points are respectively multiplied by coefficients indicated by an opponent's habit data, i.e., the non-player character's habit data; and then resultant points are added up. Further, in the case of such a specific situation as described above, the specific situation additional points indicated by the opponent's habit data, i.e., the non-player character's habit data, are added to the above added-up points to calculate the evaluation points E. Thus, the evaluation points E are calculated by the following equation:

$$E = \text{safety basic points} \times \text{coefficient } A + \text{winning probability basic points} \times \text{coefficient } B + \text{specific situation additional points}$$

The above safety basic points are a value which is a sum of the safety basic points calculated in relation to the respective opponents of the non-player character, i.e., the safety basic points in relation to an opponent a+the safety basic points in relation to an opponent b+the safety basic points in relation to an opponent c. The safety basic points in relation to the respective opponents are each set using the safety basic point calculation table shown by the basic point calculation table data Di (see FIG. 16). For example, as shown in FIG. 16, when a tile to be discarded by the currently selected move is "genbutsu" for the opponent a, the safety basic point=0 is set in relation to the opponent a. When a tile to be discarded by the currently selected move is "suji" or "kabe" for the opponent b and the opponent b is in the state of "reach", the safety basic points=−20 are set in relation to the opponent b. Further, when a tile to be discarded by the currently selected move is neither "genbutsu", "suji" nor "kabe" for the opponent c and the opponent c is "calling", the safety basic points=−10 are set in relation to the opponent c.

The winning probability basic points are a parameter which indicates, in relation to the currently selected move, a minimum number of necessary tiles to win. The winning probability basic points are set using the winning probability basic point calculation table shown by the basic point calculation table data Di (see FIG. 17). For example, as shown in FIG. 17, in the case where a minimum number of necessary tiles to be "tenpai" will become "1" as a result of performing the currently selected move, the winning probability basic points=150 are set.

Then, the CPU 10 calculates the evaluation points E of the currently selected move of the non-player character, by using the safety basic points and the winning probability basic points set in the above manner and the habit data (e.g., the coefficient A, the coefficient B and the specific situation additional points) indicated by the opponent habit data De of the opponent, i.e., the non-player character, which is currently having a turn.

Next, the CPU 10 determines whether or not the evaluation points E calculated at the above step 110 are greater than current highest points Ebest (step 111). When the evaluation points E are not greater than the current highest points Ebest (E≦Ebest), the CPU 10 proceeds to a process at a next step 113. On the other hand, when the evaluation points E are greater than the current highest points Ebest (E>Ebest), the CPU 10 sets new highest points Ebest by using the evaluation points E, and updates the highest point data Dk (step 112). Then, the processing proceeds to the next step 113.

At step 113, the CPU 10 determines whether or not all the possible moves have been evaluated. When all the possible moves have been evaluated, the CPU 10 proceeds to a process at a next step 114. On the other hand, when there is a move which has not been evaluated yet, the CPU 10 returns to the above step 109, and repeats the processing.

At step 114, the CPU 10 selects a move which currently has the highest points Ebest, as a move of the non-player character (an opponent of the player), and causes the opponent non-player character to perform the selected move. Then, the processing proceeds to the next step 106. At step 114, a portrait image of the opponent may be displayed.

At the above step 107, when the current situation is waiting for the online opponent to perform an operation, the CPU 10 waits until data transmitted from the online opponent is received (step 115). Upon receiving data from the online opponent (Yes at step 115), the CPU 10 causes the player character of the online opponent to perform a move in accordance with the data (step 116), and then proceeds to a process at the next step 106.

At step 106, the CPU 10 determines whether or not the player-versus-player game has ended. For example, when any participant of the versus game "wins" the game, the CPU 10 determines that the versus game has ended. When the versus game has not ended, the CPU 10 returns to the above step 102, and repeats the processing. On the other hand, when the versus game has ended, the CPU 10 ends the processing of the subroutine.

Return to FIG. 18. After the player-versus-player game process at the above step 56, the CPU 10 performs the player-versus-player game ending process (step 57), and proceeds to a process at a next step. Hereinafter, operations performed in the player-versus-player game ending process at step 57 will be described in detail with reference to FIG. 21.

In FIG. 21, the CPU 10 updates statistical information based on actions of the player character performed during the player-versus-player game which has ended (step 121), and proceeds to a process at a next step. For example, the CPU 10 updates statistical information, (e.g., the winning rate, furikomi rate, etc) about the entire versus game which has ended, contained in the statistical information data Dl, by using results of the entire versus game such as whether or not the player character has won the game, whether or not the player character has done furikomi to a non-player character or another player character, and the like.

Next, the CPU 10 updates the habit data based on the statistical information updated at the above step 121 (step 122), and proceeds to a process at a next step. For example, the CPU 10 refers to the coefficient A calculation table (see FIG. 13) and the coefficient B calculation table (see FIG. 14) of the habit data calculation table data Dh to reset the coefficients A and B based on the updated statistical information. Then, the CPU 10 updates the player habit data Dc by using the reset coefficients A and B.

Next, the CPU 10 determines whether or not the player-versus-player game which has ended is an online versus game. For example, if an online versus game has been selected at the process of the above step 81, the CPU 10 proceeds to a process at a next step 124. On the other hand, if a local versus game has been selected at the process of the above step 81, the CPU 10 ends the processing of the subroutine.

At step 124, the CPU 10 transmits, to the game apparatuses 3 of the opponents whom the player has played against via the network, the portrait data and the habit data of the player contained in the player portrait data Db and the player habit data Dc, via the network. Next, the CPU 10 receives the portrait data and the habit data transmitted from the game apparatuses 3 of the opponents whom the player has played against via the network (step 125). Then, the CPU 10 updates the opponent portrait data Dd and the opponent habit data De, by using the received portrait data and the habit data of the opponents (step 126), and then ends the processing of the subroutine. Then, the game apparatuses 3 exchange their habit data which have been updated by the processes at these steps 124 to 126 after the versus game.

Return to FIG. 18. After the player-versus-player game ending process at the above step 57, the CPU 10 determines whether or not to end the game. The game is to be ended, for example, when conditions for game over are satisfied, or when the player has performed an operation to end the game. When the game is not to be ended, the CPU 10 returns to the above step 55 and repeats the processing, whereas when the game is to be ended, the CPU 10 ends the processing of the flowchart.

As described above, the game apparatus 3 according to the present embodiment transmits/receives to and from other game apparatuses 3, the habit data of the players and image data of the player characters controlled by the players. When, after ending the online versus play against the other game apparatuses 3, the game apparatus 3 uses, as non-player characters in a new versus game, characters previously used by the other game apparatuses 3, the game apparatus 3 displays, on the screen, the characters based on image data which the game apparatus 3 has already received, and controls actions of the characters in accordance with the habit data which the game apparatus 3 has already received. This allows the player of the game apparatus 3 to feel as if to be really playing the game against the player characters controlled by the players of the other game apparatus 3, and thus improves reality of the simulated play.

Note that, from each player-versus-player game, the furikomi rate and the winning rate of the entire game are used as exemplary statistical values in relation to actions of the player character performed in response to operations by the player. However, the habit data may be set based on other statistical values. For example, a rate of the player having "called" or having got a "reach", average points which the player has acquired when "winning" the game, a rate of the player having won when getting a "reach", or the like may be used to estimate a tendency of the player, and the habit data may be generated using a result of the estimation. At a certain number of turns of the player in the versus game (e.g., every fifth turn of the player), the number of honor tiles included in the player's hand may be counted to estimate a tendency of the player to prefer honor tiles, and the habit data may be generated based on a result of the estimation. Further, various situations in the versus game may be chosen as the aforementioned specific situation. Then, by setting the above-described specific situation additional point calculation table for each chosen situation, parameters indicating tendencies of the player in various specific situations can be added to the habit data.

In the initial setting of the habit data in the process at the above step 54, the habit data is initialized such that a habit indicated by the habit data is flat, i.e., the habit data does not indicate any particular habit. However, the habit data may be initialized differently. As one example, the habit data may be set based on the portrait which is selected in the process at the above step 53. To be more specific, when the portrait of the player of the game apparatus 3 is created by compositing part objects which are prepared in advance for respective parts of the portrait, the initial habit data is generated based on selected part objects. For instance, when arched eyebrows are selected as parts of the portrait, the value of the coefficient A of the initial habit data is set to be small and the coefficient B thereof is set to be large. When lowered eyebrows are selected as parts of the portrait, the value of the coefficient A of the initial habit data is set to be large and the coefficient B thereof is set to be small. Thus, by setting the habit data so as to be associated with the portrait, a more realistic player-versus-player game can be provided.

As another further example, the habit data may be set in accordance with a time consumed to create the portrait in the process at the above step 53. To be specific, a time consumed by the player of the game apparatus 3 to create the portrait is measured, and then the habit data to be grouped with the portrait is initialized based on the consumed time. For example, the habit data of the player who has consumed a relatively short time for creating the portrait is initialized so as to indicate that the player is a type of person who simply puts a priority on winning the game rather than carefully thinking other things (e.g., the coefficient A is set to have a small value, and the coefficient B is set to have a large value). Also, the habit data of the player who has consumed a relatively long time for creating the portrait is initialized so as to indicate that the player is a type of person who considers carefully and avoids doing furikomi (e.g., the coefficient A is set to have a large value, and the coefficient B is set to have a small value). Thus, by setting the habit data so as to be associated with a time consumed to create the portrait, a more realistic player-versus-player game is realized.

Further, questions in relation to other players operating other player characters may be set, and the habit data of the other players may be corrected based on answers to the questions provided by the player. For example, questions in relation to the other players such as "Is he impatient?" or "Is he indrawn?" may be provided, and the values of the coefficients A and B may be corrected based on the answers thereto. This allows the habit data of the other players, which reflect personalities or the like of the other players observed from an objective point of view, to be generated.

Still further, in the above-described embodiment, the portrait data is used as data indicating images representing the other player characters operated by the other players. However, different image data may be used as long as the different image data indicates the images representing the other player characters. For example, the player-versus-player game may be executed by using, in addition to the habit data of the other players, data indicating photos of the other players. Alternatively, the player-versus-player game may be executed by using, in addition to the habit data of the other players, data indicating images of characters selected by the other players.

Still further, in the above embodiment, the mah-jong game is used as an example of a game to be executed using the portrait data and the habit data of the other players. However, different games can be executed using the portrait data and the habit data of the other players. For example, the present invention may be applied, e.g., to a player-versus-player game such as shogi, go, tennis or baseball game, or to a fighting game in which the player character fights against another player character, or to a game in which the player plays in cooperation with other players. For example, in a tennis game in which the player character plays against an opponent character in a virtual game world, the habit data is generated so as to indicate play habits of another player in his/her past play (e.g., service placements, high accuracy of the first service, aggressive serving at the first service, and a rate of approaching the net). By obtaining the habit data together with image data of the opponent character controlled by said another player, a realistic tennis game for playing against said another player is realized. In a baseball game in which the player character plays against an opponent character in a virtual game world, the habit data is generated so as to indicate play habits of another player in his/her past play (e.g., most of his/her pitches are breaking balls, most of his/her pitches are fast balls, and a rate of hitting a first pitch). By obtaining the habit data together with image data of the opponent character controlled by said another player, a realistic baseball game for playing against said another player is realized.

Still further, when online opponents (i.e., other players operating game apparatuses 3 in an online versus play) participate in the above-described player-versus-player game, any one of the game apparatuses 3 participating in the versus game may perform the processes at the above steps 108 to 114 on behalf of all the participants. In this case, said any one of the game apparatuses 3 having performed the above processes transmits a result of the processing to the other game apparatuses 3. For example, from among a plurality of game apparatuses 3 participating in the player-versus-player game, a game apparatus 3 to act as a "dealer" may be determined, and the game apparatus 3 which is the "dealer" may transmit the aforementioned processing result to the other game apparatuses 3.

Still further, the above embodiment gives an example in which a group of the portrait data and the habit data transmitted from another game apparatus 3 is used to control actions of a non-player character appearing in the virtual game world. However, a group of the portrait data and the habit data, which is generated in advance by the game apparatus 3, may be used to control actions of a non-player character appearing in the virtual game world. For example, a player A plays the above-described player-versus-player game by using the game apparatus 3, and the portrait data indicating a portrait created by the player A and the habit data of the player A are stored in the game apparatus 3. Thereafter, when a player B uses the same game apparatus 3 to play the same player-versus-player game, the player B selects, as an opponent, a non-player character whose actions are controlled using the portrait data and the habit data of the player A which are already stored in the game apparatus 3. This allows the player B to play a realistic versus game against the player A. For example, in the case of such a game as a mah-jong game, card game or the like where opponents' tiles or cards are hidden during the game, it is difficult for a plurality of players to operate the same game apparatus 3 at the same time to play the game. However, using the portrait data and the habit data obtained in advance realizes a realistic game in which the player feels as if the game was played by a plurality of players performing operations at the same time. In this case, the game apparatus 3 may not necessarily have functions to communicate with another game apparatus 3.

Still further, the above description describes an example in which the present embodiment is applied to the stationary game apparatus body 5 which performs processing in accordance with an operation performed on the controller 7. However, the present embodiment is also applicable to a handheld game apparatus. For example, the above-described game process is performed in accordance with an operation performed on an operation button provided on a main body of the handheld game apparatus. By applying the present embodiment in such a manner, the game process of the present embodiment can be realized even on a handheld game apparatus or the like.

Still further, the above description describes an example in which the present embodiment is applied to a stationary or handheld game apparatus. However, the present embodiment may be applied, e.g., to an information processing apparatus such as a general personal computer operated by an input device, or to a portable information processing device. The portable information processing device to which the present embodiment is applicable is, e.g., a general personal computer, a mobile phone, a PDA (Personal Digital Assistant) or the like.

Still further, in the above description, the controller 7 and the game apparatus body 5 are connected by radio communication. However, the controller 7 and game apparatus body 5 may be electrically connected by a cable. In such a case, the cable connected to the controller 7 is connected to a connecting terminal of the game apparatus body 5.

It is understood that the shapes of the controller 7 and the operation sections 72 mounted thereon, the number of operation sections 72, the positions in which the operation sections 72 are provided, and the like in the above description are merely examples. The present embodiment can be realized even if these shapes, numbers, positions and the like are different from the above description. Further, the manner of generating the habit data to be used in the above processing, the manner of displaying game images, and the like above are merely examples, and the descriptions thereof are simplified in order to give simple descriptions. It is understood that the present embodiment can be realized even if the manner of generating the habit data to be used in the above processing, the manner of displaying game images, and the like are different from the above descriptions.

The game program of the present embodiment may be supplied to the game apparatus body 5 not only via an external storage medium such as the optical disc 4, but also via a wired or wireless communication line. Further, the game program may be prestored in a non-volatile storage device provided within the game apparatus body 5. Note that, an information storage medium for storing the game program may be a CD-ROM, DVD or other similar optical disc storage medium, or may be a non-volatile semiconductor memory.

The game apparatus and the storage medium storing the game program according to the present embodiment are capable of improving reality of a simulated versus game against another player, and useful as an apparatus and a program for performing various information processing such as game processing and the like.

While the example embodiments presented herein have been described in detail, the foregoing description is in all aspects illustrative and not restrictive. It is understood that numerous other modifications and variations can be devised without departing from the scope of the embodiments.

What is claimed is:

1. A game apparatus capable of executing a predetermined game in accordance with operation inputs performed by a player, and communicating with another game apparatus, the game apparatus comprising:
   an operation data obtaining unit for obtaining operation data outputted from an input device;
   an image data generation unit for generating image data comprising an image which represents the player operating the game apparatus in accordance with the operation data;
   a player character control unit for causing a player character represented by the image data and appearing in a virtual game world to perform an action in accordance with the operation data;
   an operation tendency data generation unit for generating, based on actions performed by the player character controlled by the player character control unit, operation tendency data which indicates a tendency in operations performed by the player operating the player character;
   a player data storage memory for storing image data of the player character controlled by the player character control unit and the operation tendency data generated by the operation tendency data generation unit;

a transmission unit for transmitting, to said another game apparatus, a group of the image data and the operation tendency data stored in the player data storage memory;

a reception unit for receiving a group of the image data and the operation tendency data transmitted from said another game apparatus;

a non-player data storage memory for storing the group of the image data and the operation tendency data of said another game apparatus which the reception unit has received;

a display control unit for, based on the image data of said another game apparatus stored in the non-player data storage memory, displaying on a display device an image of a non-player character indicated by the image data; and a non-player character control unit for controlling, based on the operation tendency data of said another game apparatus stored in the non-player data storage memory, an action performed by the non-player character in the virtual game world.

2. The game apparatus according to claim 1, wherein the image data generation unit generates, as the image data, data indicating a portrait which is created by selecting, in accordance with the operation data, a part object for each part of the portrait from among a plurality of types of part objects prepared in advance for each part of the portrait, and by compositing selected part objects.

3. The game apparatus according to claim 1, wherein the non-player character control unit determines an action of the non-player character by weighting, using numerical values indicated by the operation tendency data, respective points of items set for a game situation.

4. The game apparatus according to claim 3, wherein the non-player character control unit:
weights, using the numerical values indicated by the operation tendency data, the respective points of the items which are set for each action option for the game situation;
calculates total points for each action option; and
determines an action option of highest total points as an action to be performed by the non-player character.

5. The game apparatus according to claim 3, wherein the operation tendency data generation unit generates the operation tendency data by estimating, based on a rate of selecting an action of the player character in a game situation, a tendency in operations performed by the player.

6. The game apparatus according to claim 5, wherein each time a similar situation to the game situation appears, the operation tendency data generation unit updates the rate of selecting the action, thereby updating the operation tendency data.

7. The game apparatus according to claim 3, wherein the operation tendency data generation unit includes a statistical information generation unit for generating and storing statistical information about a result of the game in which the player character has performed actions, and the operation tendency data generation unit estimates, based on the statistical information about the player character, a tendency in operations performed by the player, thereby generating the operation tendency data.

8. The game apparatus according to claim 1, further comprising:
a question providing unit for providing a question in relation to a player of said another game apparatus; and an operation tendency data correction unit for correcting, in accordance with the operation data which is obtained as an answer to the question from the question providing unit, the operation tendency data indicating a tendency in operations performed by the player of said another game apparatus, which operation tendency data is stored in the non-player data storage memory.

9. The game apparatus according to claim 2, wherein the operation tendency data generation unit sets an initial value indicated by the operation tendency data, in accordance with the part object selected by the image data generating unit.

10. A game apparatus capable of executing a predetermined game in accordance with operation inputs performed by a player, the game apparatus comprising:
an operation data obtaining unit for obtaining operation data outputted from an input device;
an image data generation unit for generating image data comprising an image which represents the player operating the game apparatus in accordance with the operation data;
a player character control unit for causing a player character represented by the image data and appearing in a virtual game world to perform an action in accordance with the operation data;
an operation tendency data generation unit for generating, based on actions performed by the player character controlled by the player character control unit, operation tendency data which indicates a tendency in operations performed by the player operating the player character;
a player data storage memory for storing image data of the player character controlled by the player character control unit and the operation tendency data generated by the operation tendency data generation unit;
a non-player data storage unit for selecting, from among groups of the image data and the operation tendency data stored in the player data storage memory, a group of the image data and the operation tendency data to be used to display a non-player character and cause the non-player character to perform an action, and storing the selected group of the image data and the operation tendency data;
a display control unit for, based on the image data stored in the non-player data storage memory, displaying on a display device an image of the non-player character indicated by the image data; and
a non-player character control unit for controlling, based on the operation tendency data stored in the non-player data storage unit, the action of the non-player character in the virtual game world.

11. A non-transitory computer-readable storage medium for storing a game program to be executed by a computer of a game apparatus which is capable of executing a predetermined game in accordance with operation inputs performed by a player and which is capable of communicating with another game apparatus, the game program causing the computer to perform:
obtaining operation data outputted from an input device;
generating image data comprising an image which represents the player operating the game apparatus in accordance with the operation data;
causing a player character represented by the image data and appearing in a virtual game world to perform an action in accordance with the operation data;
generating, based on actions of the player character, operation tendency data which indicates a tendency in operations performed by the player operating the player character;

storing, in a memory, image data of the player character and the generated operation tendency data;

transmitting, to said another game apparatus, a group of the image data and the operation tendency data stored in the memory;

receiving a group of the image data and the operation tendency data transmitted from said another game apparatus;

storing, in the memory, the received group of the image data and the operation tendency data of said another game apparatus;

based on the image data of said another game apparatus stored in the memory, displaying on a display device an image of a non-player character indicated by the image data; and controlling, based on the operation tendency data of said another game apparatus stored in the memory, an action performed by the non-player character in the virtual game world.

12. A non-transitory computer-readable storage medium for storing a game program to be executed by a computer of a game apparatus which is capable of executing a predetermined game in accordance with operation inputs performed by a player, the game program causing the computer to perform:

obtaining operation data outputted from an input device;

generating image data comprising an image which represents the player operating the game apparatus in accordance with the operation data;

causing a player character represented by the image data and appearing in a virtual game world to perform an action in accordance with the operation data;

generating, based on actions of the player character, operation tendency data which indicates a tendency in operations performed by the player operating the player character;

storing, in a memory, image data of the player character and the generated operation tendency data;

selecting, from among stored groups of the image data and the operation tendency data, a group of the image data and the operation tendency data to be used to display a non-player character and cause the non-player character to perform an action, and storing, in the memory, the selected group of the image data and the operation tendency data;

based on the image data stored in the memory, displaying on a display device an image of the non-player character indicated by the image data; and controlling, based on the selected operation tendency data stored in the memory, the action of the non-player character in the virtual game world.

13. A computer implemented method for executing a predetermined game in accordance with operation inputs performed by a player, the game being executed in a game apparatus which is capable of communicating with another game apparatus, the method comprising:

obtaining operation data outputted from an input device;

generating image data comprising an image which represents the player operating the game apparatus in accordance with the operation data;

causing a player character represented by the image data and appearing in a virtual game world to perform an action in accordance with the operation data;

generating, via at least one computer processing device, based on actions of the player character, operation tendency data which indicates a tendency in operations performed by the player operating the player character;

storing, in a memory, image data of the player character and the generated operation tendency data;

transmitting, to said another game apparatus, a group of the image data and the operation tendency data stored in the memory;

receiving a group of the image data and the operation tendency data transmitted from said another game apparatus;

storing, in the memory, the received group of the image data and the operation tendency data of said another game apparatus;

based on the image data of said another game apparatus stored in the memory, displaying on a display device an image of a non-player character indicated by the image data; and controlling, based on the operation tendency data of said another game apparatus stored in the memory, an action performed by the non-player character in the virtual game world.

14. A computer implemented method for executing a predetermined game in accordance with operation inputs performed by a player, the method comprising:

obtaining operation data outputted from an input device;

generating image data comprising an image which represents the player in accordance with the operation data;

causing a player character represented by the image data and appearing in a virtual game world to perform an action in accordance with the operation data;

generating, via at least one computer processing device, based on actions of the player character, operation tendency data which indicates a tendency in operations performed by the player operating the player character;

storing, in a memory, image data of the player character and the generated operation tendency data;

selecting, from among groups of the stored image data and the operation tendency data, a group of the image data and the operation tendency data to be used to display a non-player character and cause the non-player character to perform an action, and storing, in the memory, the selected group of the image data and the operation tendency data;

based on the image data stored in the memory, displaying on a display device an image of the non-player character indicated by the image data; and controlling, based on the operation tendency data stored in the memory, the action of the non-player character in the virtual game world.

15. A game system capable of executing a predetermined game in accordance with operation inputs performed by a player, and communicating with another game system, the game system comprising:

a processing system, including one or more computer processors;

an operation data obtaining unit for obtaining operation data outputted from an input device;

an image data generation unit for generating image data comprising an image which represents the player operating the game apparatus in accordance with the operation data;

a player character control unit for causing a player character represented by the image data and appearing in a virtual game world to perform an action in accordance with the operation data;

an operation tendency data generation unit for generating, based on actions performed by the player character controlled by the player character control unit, operation tendency data which indicates a tendency in operations performed by the player operating the player character;

a player data storage memory for storing image data of the player character controlled by the player character control unit and the operation tendency data generated by the operation tendency data generation unit;

a transmission unit for transmitting, to said another game system, a group of the image data and the operation tendency data stored in the player data storage memory;

a reception unit for receiving a group of the image data and the operation tendency data transmitted from said another game system;

a non-player data storage memory for storing the group of the image data and the operation tendency data of said another game system which the reception unit has received;

a display control unit for, based on the image data of said another game system stored in the non-player data storage memory, displaying on a display device an image of a non-player character indicated by the image data; and a non-player character control unit for controlling, based on the operation tendency data of said another game system stored in the non-player data storage memory, an action performed by the non-player character in the virtual game world.

16. A game system capable of executing a predetermined game in accordance with operation inputs performed by a player, the game system comprising:

a processing system, including one or more computer processors;

an operation data obtaining unit for obtaining operation data outputted from an input device;

an image data generation unit for generating image data comprising an image which represents the player in accordance with the operation data;

a player character control unit for causing a player character represented by the image data and appearing in a virtual game world to perform an action in accordance with the operation data;

an operation tendency data generation unit for generating, based on actions performed by the player character controlled by the player character control unit, operation tendency data which indicates a tendency in operations performed by the player operating the player character;

a player data storage memory for storing image data of the player character controlled by the player character control unit and the operation tendency data generated by the operation tendency data generation unit;

a non-player data storage unit for selecting, from among groups of the image data and the operation tendency data stored in the player data storage memory, a group of the image data and the operation tendency data to be used to display a non-player character and cause the non-player character to perform an action, and storing the selected group of the image data and the operation tendency data;

a display control unit for, based on the image data stored in the non-player data storage memory, displaying on a display device an image of the non-player character indicated by the image data; and a non-player character control unit for controlling, based on the operation tendency data stored in the non-player data storage unit, the action of the non-player character in the virtual game world.

* * * * *